US006948112B2

(12) United States Patent
Hornung et al.

(10) Patent No.: US 6,948,112 B2
(45) Date of Patent: Sep. 20, 2005

(54) SYSTEM AND METHOD FOR PERFORMING BACKWARD ERROR RECOVERY IN A COMPUTER

(75) Inventors: Bryan Hornung, Plano, TX (US); Keith W. Shaw, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 832 days.

(21) Appl. No.: 09/853,955

(22) Filed: May 10, 2001

(65) Prior Publication Data

US 2002/0170015 A1 Nov. 14, 2002

(51) Int. Cl.$^7$ ............................................. G11C 29/00
(52) U.S. Cl. ........................ 714/766; 714/42; 714/52; 714/54; 714/807; 714/5; 714/6; 365/201
(58) Field of Search ............................... 714/766, 763, 714/752, 746, 2, 5, 6, 25, 42, 52, 54, 807, 805; 365/201, 189.01; 712/6

(56) References Cited

U.S. PATENT DOCUMENTS

| | | | |
|---|---|---|---|
| 3,573,851 A | * 4/1971 | Watson et al. ................. 712/6 |
| 4,695,947 A | 9/1987 | Ikeda et al. .................. 364/200 |
| 4,849,978 A | 7/1989 | Dishon et al. ................ 371/51 |
| 5,230,045 A | 7/1993 | Sindhu ....................... 395/425 |
| 5,446,691 A | 8/1995 | North et al. ........... 365/189.02 |
| 5,761,695 A | 6/1998 | Maeda et al. .................. 711/5 |

* cited by examiner

*Primary Examiner*—Albert Decady
*Assistant Examiner*—Dipakkumar Gandhi

(57) ABSTRACT

A system for performing data error recovery includes a memory unit and a memory controller. The memory unit includes a plurality of memory locations, and the memory controller maintains a checksum in one of the memory locations. At various times, the memory controller receives requests to update the checksum with data values identified by the requests. In response, the memory controller combines the checksum with these data values and stores the foregoing data values into memory. In one embodiment, the memory controller stores the foregoing data values into a plurality of stacks based on which protection domains are associated with the data values. In response to a detection of a data error, the memory controller retrieves a plurality of the stored data values and recovers a previous state of a particular memory location by combining each of the retrieved data values to the checksum.

40 Claims, 29 Drawing Sheets

SYSTEM AND METHOD FOR PERFORMING BACKWARD ERROR RECOVERY IN A COMPUTER

BACKGROUND OF THE INVENTION

1. Field of the Invention

The present invention generally relates to data processing techniques and, in particular, to a system and method for performing backward error recovery (BER) in a computer.

2. RELATED ART

Large computer systems (e.g. servers) often employ a plurality of memory units to provide enough instruction and data memory for various applications. Each memory unit has a large number of memory locations of one or more bits where data can be stored, and each memory location is associated with and identified by a particular memory address, referred to hereafter as a "memory unit address." When an instruction that stores data is executed, a bus address defined by the instruction is used to obtain a memory unit address, which identifies the memory location where the data is actually to be stored. In this regard, a mapper is often employed that maps or translates the bus address into a memory unit address having a different value than the bus address. There are various advantages associated with utilizing bus addresses that are mapped into different memory unit addresses.

For example, many computer applications are programmed such that the bus addresses are used consecutively In other words, one of the bus addresses is selected as the bus address to be first used to store data. When a new bus address is to be utilized for the storage of data, the new bus address is obtained by incrementing the previously used bus address.

If consecutive bus addresses are mapped to memory unit addresses in the same memory unit, then inefficiencies may occur. In this regard, a finite amount of time is required to store and retrieve data from a memory unit. If two consecutive data stores occur to the same memory unit, then the second data store may have to wait until the first data store is complete before the second data store may occur. However, if the two consecutive data stores occur in different memory units, then the second data store may commence before the first data store is complete. To minimize memory latency and maximize memory bandwidth, consecutive bus addresses should access as many memory units as possible. This can also be described as maximizing the memory interleave.

As a result, the aforementioned mapper is often designed to map the bus addresses to the memory unit addresses such that each consecutive bus address is translated into a memory unit address in a different memory unit. For example, a bus address having a first value is mapped to a memory unit address identifying a location in a first memory unit, and the bus address having the next highest value is mapped to a memory unit address identifying a location in a second memory unit. Therefore, it is likely that two consecutive data stores from a single computer application do not occur in the same memory unit. In other words, it is likely that consecutive data stores from a computer application are interleaved across the memory units.

Backup systems are often employed to enable the recovery of data in the event of a failure of one of the memory units. For example, U.S. Pat. No. 4,849,978, which is incorporated herein by reference, describes a checksum backup system that may be used to recover the data of a failed memory unit To backup data stored within the memory units of a typical computer system, one of the memory units in the computer system is designated as a checksum memory unit. Each location in the checksum memory unit is correlated with locations in the other non-checksum memory units During operation, a checksum value is maintained in each memory location of the checksum memory unit according to techniques that will be described in more detail hereinbelow. Each checksum value may be utilized to recover any of the non-checksum data values stored in any of the memory locations correlated with the checksum memory location that is storing the checksum value. The checksum value stored in a checksum memory location and each of the non-checksum values stored in a location correlated with the checksum memory location shall be collectively referred to herein as a "checksum set."

Each location in the checksum memory unit is initialized to zero. Each data value being stored in a location of one of the non-checksum memory units is exclusively ored with the data value previously stored in the location of the one non-checksum memory unit. In other words, the data value being stored via a data store operation is exclusively ored with the data value being overwritten via the same data store operation. The result of the exclusive or operation is then exclusively ored with the value, referred to as the "checksum," in the correlated address of the checksum memory unit. The result of the foregoing exclusive or operation is then stored in the foregoing address of the checksum memory unit as a new checksum value.

When a memory unit fails, the data value stored in a location of the failed memory unit can be recovered by exclusively oring the checksum in the correlated location of the checksum memory unit with each of the values in the other memory units that are stored in locations also correlated with the location of the checksum. The process of maintaining a checksum and of recovering a lost data value based on the checksum is generally well known in the art.

When a processor failure does occur, it is often desirable to return the computer system to a previously known state, which is assumed to be error free, and restart execution from this known state. The process for returning a computer system to a previously known state is often referred to backward error recover (BER). By performing BER after a processor failure, it can be ensured that any errors introduced by the failure are effectively eliminated.

BER is normally achieved by saving an additional copy of all memory values, including checksum values. This additional copy is stored in memory, referred to hereafter as "backup memory," dedicated for storing the additional copy. The remainder of the computer system's memory shall be referred to hereafter as "main memory".

Initially, the memory values stored in backup memory are identical to the memory values stored in main memory. This computer system state, which includes the same memory values in main memory and backup memory, is commonly referred to as a "checkpoint state." As the computer system executes instructions, the data values in main memory are updated, and the data values written to main memory are also transmitted to a first in, first out (FIFO) device. If a processor fails during execution, the main memory can be returned to its checkpoint state by copying the memory values of the backup memory to main memory. Once the main memory is returned to its checkpoint state, the BER process is complete.

If the computer system executes instructions for a period of time without error and, therefore, without performing BER, then the checkpoint state can be updated such that the copy stored in backup memory represents a more recent state of the main memory. To achieve this, the data values in the FIFO device are used to update the values in the backup memory such that the values in the backup memory are identical to the values stored in main memory at a time later than the time of the original checkpoint state. The state of the backup memory then represents a later checkpoint state of the main memory. Thus, the backup memory can now be used to return the state of the computer system to the later checkpoint state in the event of a future processor failure. The backup memory can be periodically updated, as described above, such that the backup memory always represents a relatively recent state of main memory. As a result, the impact of performing BER can be minimized.

Unfortunately, performing BER in a system with reliable memory can introduce numerous problems and data errors related to multiple protection domains and memory failures. For example, if a memory system failure occurs during a BER, then it is possible that the checksum values will be inconsistent or, in other words, will not represent the correct checksums of the values being backed up by the checksum values. Due to complexities involved in protecting against errors that occur as a result of memory system failures during BER, most prior art systems do not implement measures to protect against such errors, thereby forcing these systems to duplicate data in expensive backup memory or leaving these systems vulnerable during BER processes.

Furthermore, when a BER process is performed, normally each value within main memory is returned to its checkpoint state. Such a methodology helps to keep checksum values consistent with the non-checksum values such that memory failures can be handled independently of processor failures. However, when the BER process occurs because of an error in a single protection domain, only the data values associated with the single protection domain should be returned to their checkpoint state. Returning the other values within main memory to their checkpoint state may introduce errors in the other protection domains that are part of the computer system.

Thus, a heretofore unaddressed need exists in the industry for providing an improved system and method for performing BER, particularly in systems with checksum memory and/or multiple protection domains. It is desirable for the system and method to operate efficiently and to avoid data errors that may occur when a memory failure occurs during the BER.

SUMMARY OF THE INVENTION

The present invention overcomes the inadequacies and deficiencies of the prior art as discussed hereinbefore. Generally, the present invention provides a system and method for performing backward error recovery.

In architecture, the backward error recovery system of the present invention utilizes a memory unit and a memory controller. The memory unit includes a plurality of memory locations, and the memory controller maintains a checksum in one of the memory locations. At various times, the memory controller receives requests to update the checksum with data values identified by the requests. In response, the memory controller combines the checksum with these data values and stores the foregoing data values into memory. In response to a detection of a data error, the memory controller retrieves a plurality of the stored data values and recovers a previous state of a particular memory location by combining each of the retrieved data values to the checksum.

In accordance with another feature of the present invention, the system of the present invention includes a plurality of stacks. When storing the aforementioned data values to memory, the memory controller is configured to store the data values into the plurality of stacks based on which protection domains are associated with the data values.

The present invention can also be viewed as providing a method for performing backward error recovery. The method can be broadly conceptualized by the following steps: storing a plurality of data values within a checksum set to a plurality of memory locations, the checksum set including a checksum value and a plurality of non-checksum values; updating one of the memory locations with a first data value; combining the first value to a second value to form a combined value, the second value stored in the one memory location prior to the updating step; updating the checksum value with the combined value; storing the combined value; retrieving the combined value in response to a data error; combining the value retrieved in the retrieving step to the checksum value; and recovering a previous state of the one memory location based on the combining the retrieved value step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
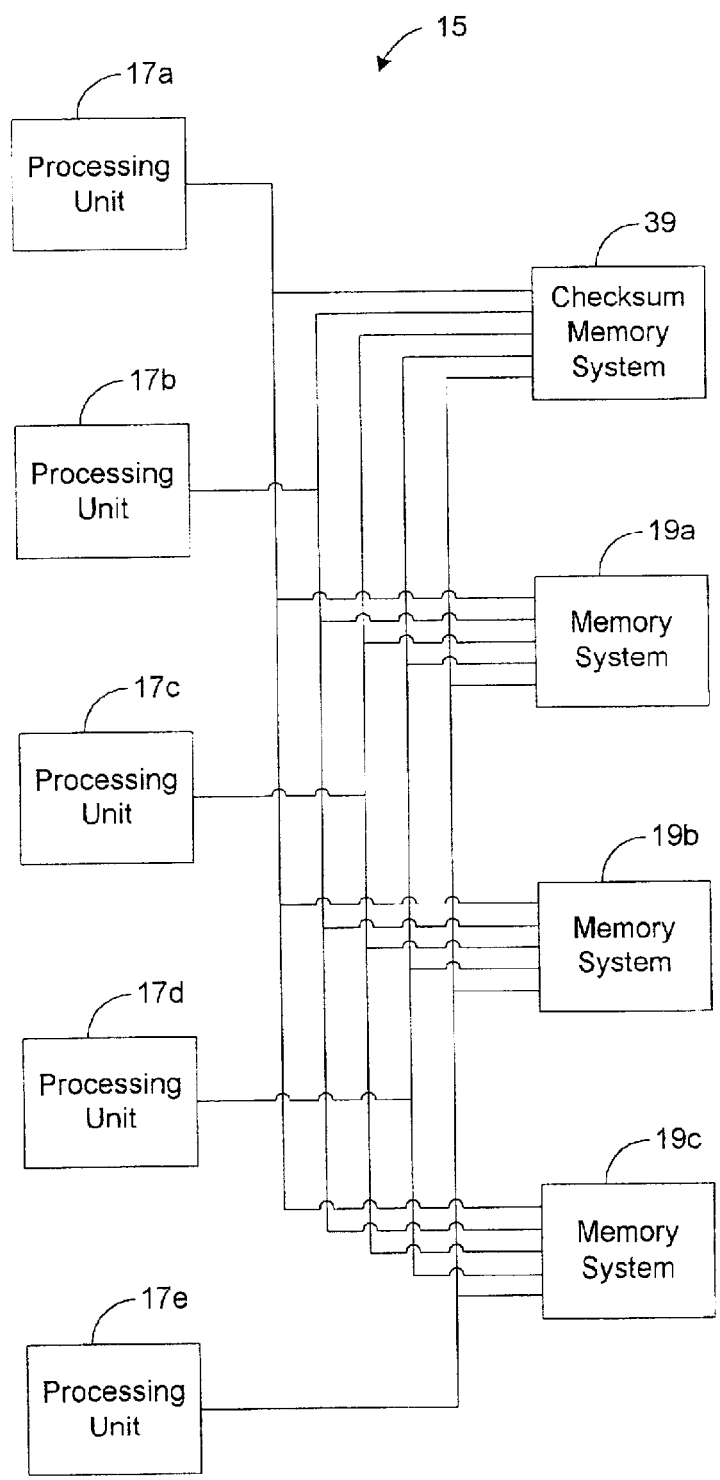
FIG. 1 is a block diagram illustrating a conventional processing system.
Figure 2:
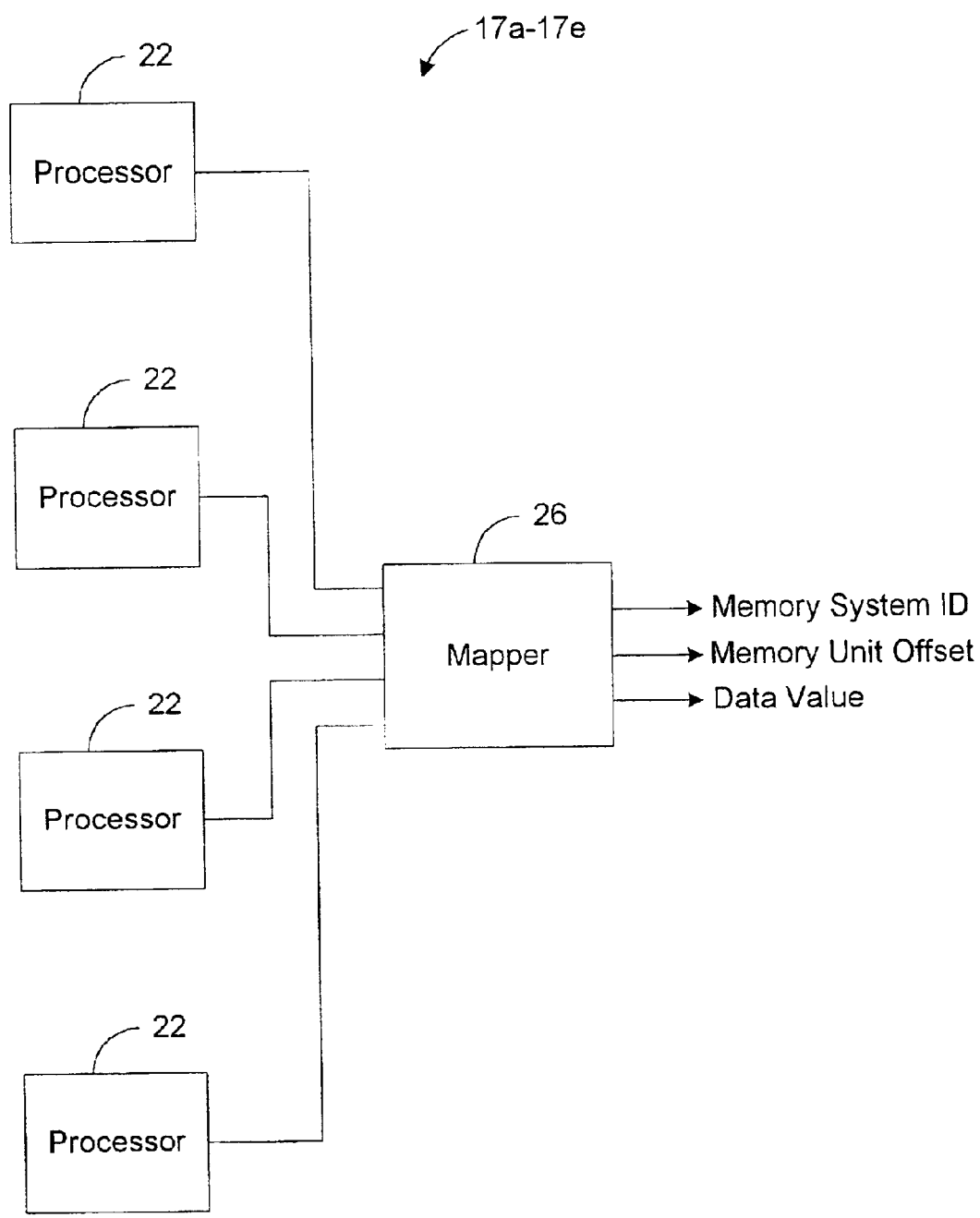
FIG. 2 is a block diagram illustrating a more detailed view of processing units depicted in FIG. 1.

FIG. 1 depicts a conventional processing system 15 including a plurality of processing units 17a–17e coupled to a plurality of memory systems 19a–19c. As shown by FIG. 2, each processing unit 17a–17e includes one or more processors 22 that are configured to execute instructions via techniques well known in the art. During execution, it is often necessary to retrieve and store data.

When a data value is to be stored in response to execution of an instruction by one of the processors 22, the processor 22 transmits a storage request to a mapper 26. The storage request includes the data value to be stored and a bus address indicative of where the foregoing data value is to be stored. The mapper 26 is configured to map the bus address into a memory unit address that includes a memory system identifier and a memory unit offset. The memory system identifier identifies one of the memory systems 19a–19c. The mapper 26 is configured to transmit a write request to each of the memory systems 19a–19c. The write request includes and is defined by the data value to be stored, the memory system identifier, and the memory unit offset.

Figure 3:
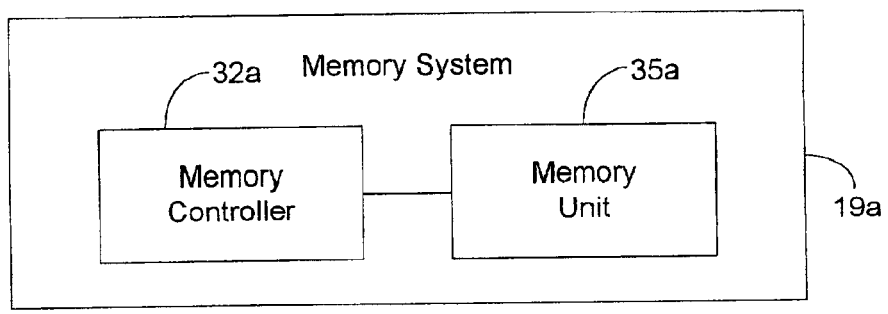
FIG. 3 is a block diagram illustrating a more detailed view of memory systems depicted in FIG. 1
Figure 3:
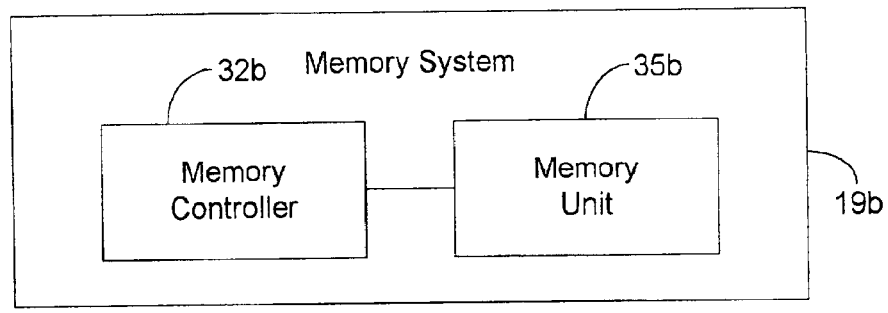
Figure 3:
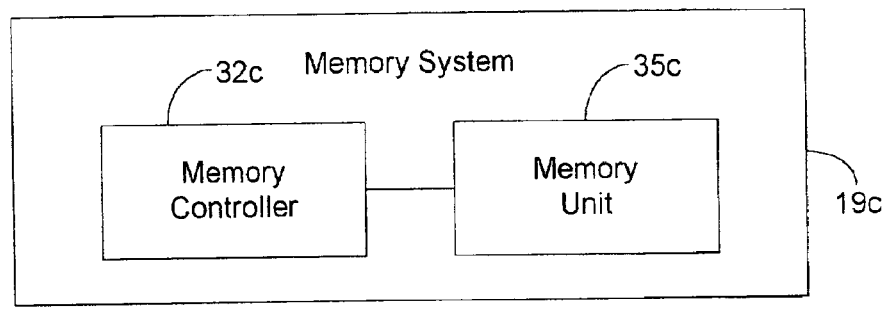
Figure 3:
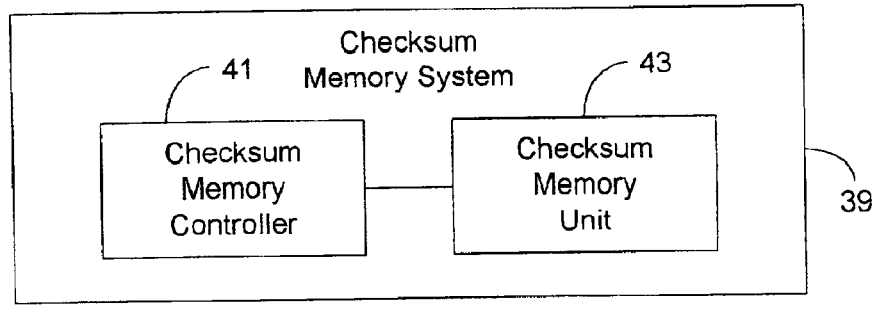

As shown by FIG. 3, each of the memory systems 19a–19c includes a memory controller 32a–32c, respectively, and a memory unit 35a–35c, respectively. Each of the memory units 35a–35c includes a plurality of memory locations where data can be stored and retrieved. The memory controller 32a–32c of the memory system 19a–19c identified by the aforementioned memory system identifier of the write request is configured to store the data value of the write request (i.e., the data value to be stored) into the memory unit 35a–35c of the identified memory system 19a–19c based on the memory unit offset. In this regard, the memory unit offset corresponds to a single location in each of the memory units 35a–35c, and the memory controller 32a–32c in the identified memory system 19a–19c is configured to store the received data value of the write request at the memory unit location corresponding to the memory unit offset.

To increase the performance of the processing system 15, the mapper 26 is configured to map consecutive bus addresses across the different memory systems 19a–19c in an interleaved fashion. For example, assume that each bus address from processors 22 is eight bits of binary information and can range from 00000000 to 11111111. The first four consecutive bus addresses are 00000000, 00000001, 00000010, and 00000011. Programmers typically utilize the bus addresses in consecutive order. Therefore, if the bus address 00000000 is initially used to store a data value, then it is likely that address 00000001 will be the next new bus address used to store data. Then, it is likely that bus address 00000010 will be used followed by bus address 00000011. This pattern is likely to be continued until no more new bus addresses are needed or until all of the bus addresses have been used.

To map the foregoing consecutive bus addresses across the memory systems 19a–19c in an interleaved fashion, the mapper 26 may map the first bus address (00000000) to a memory unit address having a memory system identifier that identifies memory system 19a. The mapper 26 may then map the second bus address (00000001) to a memory unit address having a memory system identifier that identifies memory system 19b. The mapper 26 may then map the third bus address (00000010) to a memory unit address having a memory system identifier that identifies the remaining memory system 19c. This process is repeated for each new bus address received by mapper 26. For example, when the mapper 26 receives a storage request including the fourth bus address (00000011), the mapper 26 maps the fourth bus address to a memory unit address having a memory system identifier that identifies memory system 19a.

Each bus address mapped to the same memory system 19a–19c is preferably mapped into a memory unit address having a different memory unit offset. Therefore, although a set of bus addresses may be mapped to the same memory system 19a–19c, each of the bus addresses is mapped to a unique memory unit address. Accordingly, each bus address of the foregoing set is mapped to a different location in the same memory system 39a–39c.

Through techniques similar to the techniques previously described herein, data may be retrieved from the memory systems 19a–19c. In this regard, when one of the processors 22 executes an instruction to retrieve data, a retrieval request is transmitted by the processor 22 to the mapper 26 coupled to the processor 22. The retrieval request includes the bus address that indicates where the data is to be retrieved. The mapper 26 maps the bus address to a memory unit address including a memory system identifier and a memory unit offset. The memory system identifier identifies the memory system 19a–19c storing the requested data, and the memory unit offset corresponds to the location within the memory unit 35a–35c of the identified memory system 19a–19c where the data is actually stored.

The mapper 26 transmits a read request to each of the memory systems 19a–19c in response to the retrieval request. The read request includes and is defined by the foregoing memory unit address translated from the bus address of the retrieval request. The memory controller 32a–32c of the memory system 19a–19c identified by the memory system identifier of the read request retrieves the data value in the associated memory unit 35a–35c at the location corresponding to the memory unit offset of the read request. The identified memory system 19a–19c then transmits the retrieved data value to the requesting processing unit 17a–17e. In this regard, the memory controller 32a–32c may return the retrieved data value to the mapper 26, which transmits this data value to the requesting processor 22 (i.e., the processor 22 that issued the aforementioned retrieval request), or the memory controller 32a–32c may transmit the data value to the requesting processor 22 without utilizing mapper 26.

As shown by FIG. 1, the processing system 15 also includes a checksum memory system 39 coupled to the processing units 17a–17e. As shown by FIG. 3, the checksum memory system 39, in architecture, is configured similar to the other memory systems 19a–19c. More specifically, the checksum memory system 39 includes a checksum memory controller 41 and a checksum memory unit 43. The checksum memory controller 41 is designed to store and retrieve data based on a memory unit address received by the checksum memory system 39. The checksum of each memory unit location in memory systems 19a–19c corresponding to the same memory unit offset is maintained in the memory unit location of the checksum memory unit 39 corresponding to the foregoing memory unit offset. In other words, each non-checksum data value of a checksum set is stored in one of the memory systems 19a–9c at a memory location identified by the same memory unit offset, and the checksum value of the checksum set is stored in the memory system 39 at the location identified by this same memory unit offset.

The values in the checksum memory unit 43 are initialized to zero. Each write request translated from a storage request by mapper 26 is transmitted to the other memory systems 19a–19c. As previously set forth, the memory controller 32a–32c of the memory system 19a–19c identified by the memory unit address of a transmitted write request is configured to store a data value of the write request into a memory unit location (referred to as the "destination location") corresponding to the memory unit offset of the memory unit address. Since a new value is stored into the destination location, a checksum update should be performed to update the checksum in the checksum set of the data value stored at the destination location. Therefore, in performing the data store, the memory controller 32a–32c of the identified memory system 19a–19c is also designed to exclusively or the data value being stored in the destination location with the data value previously stored in the destination location (i.e., with the data value overwritten in response to the write request). The foregoing memory controller 32a–32c then performs a checksum update by transmitting, to the checksum memory system 39, the result of this exclusive or operation and the memory unit offset correlated with the destination location. No further read or write operation to the destination location should begin occur until the checksum update is complete.

The checksum controller 41 is configured to exclusively or this result with the data value presently stored in the checksum memory unit location corresponding to the received memory unit offset (i.e., the memory unit offset identifying the destination location). The checksum memory controller 41 then stores the result of this exclusive or operation into the foregoing location of the checksum memory unit 43 (i.e., the checksum memory unit location storing the checksum of the checksum set that includes the data value of the destination location). Once this occurs, the checksum update is complete, and the location of the checksum memory unit 43 that is updated by the completed checksum update should be storing the checksum of the checksum set that includes the data value of the destination location. The checksum update should be allowed to finish even if the checksum memory controller 41 is concurrently rebuilding memory data from another memory controller 32a–32c in the same checksum set. By performing the aforementioned techniques for each data store that occurs in system 15, each location in the checksum memory unit 43 corresponding to a particular memory unit offset should be storing the checksum of the data values presently stored in the locations of memory units 35a–35c that correspond to the particular memory unit offset.

If any one of the memory systems 19a–19c fails, then the data values stored in the failed memory system 19a–19c can be recovered by using the data values in the checksum memory system 39. To recover a data value stored in a failed memory system 19a–19c, each data value in each of the other operable memory systems 19a–19c at a memory unit location corresponding to the same memory unit offset is exclusively ored with the checksum data value stored in the checksum memory system 39 at the location corresponding to the foregoing memory unit offset. In other words, each non-checksum data value, except the lost data value, of the checksum set is exclusively ored with the checksum of the checksum set. The result of these exclusive or operations should be the data value stored in the failed memory system 19a–19c at the memory unit location corresponding to the same memory unit offset.

Often, the processing units 17a–17e are grouped into protection domains to protect the data stored in memory systems 19a–19c. As will be described in further detail hereinbelow, a first processing unit grouped into one protection domain is typically allowed to access data only in a certain set of memory locations, and a second processing unit grouped into another protection domain is typically allowed to access data only in another set of memory locations. Thus, by assigning the two processing units to different protection domains, the first processing unit can be prevented from accessing data stored by the second processing unit.

For example, two of the processing units 17a and 17b could be assigned to one protection domain (PD1) and execute instructions from applications running on one operating system, and another processing unit 17c could be assigned to another protection domain (PD2) and execute instructions from applications running on another operating system. Similarly, processing units 17d and 17e could be assigned, respectively, to two protection domains (PD3 and PD4) and execute instructions from applications running on other operating systems. The processing system 15 may include any number of processing units and protection domains. However, each processing unit 17a–17e is usually assigned to a global protection domain and to only one other protection domain. The global protection domain will be described in more detail hereinbelow.

The data locations in the memory units 35a–35c are also assigned to protection domains. In this regard, each data location is assigned to only one protection domain, and a processing unit 17a–17e assigned to a particular protection domain may access a data location only if the data location is assigned to the same protection domain as the processing unit 17a–17e. It is often desirable to prevent an application running on one processing unit 17a–17e from accessing a data value produced by another application running on another processing unit 17a–17e. This may be accomplished by storing the data value in a location assigned to the same protection domain as the one processing unit 17a–17e, assuming that the other processing unit 17a–17e is not assigned to the same protection domain. The concept of assigning protection domains to data locations and processing units to prevent unauthorized data accesses is generally well known in the art.

Normally, each of the memory units 35a–35c also includes at least one block of memory assigned to a global protection domain (GPD), and as described above, each of the processing units is assigned to the GPD. Thus, any of the processing units 17a–17e may access arty of the locations in the memory locations assigned to the GPD. In other words, each memory location assigned to the GPD is shared memory. Since any of the processing units 17a–17e may access the memory locations assigned to the GPD, the processing units 17a–17e should only store, in these memory locations, global data that may be accessed by processing units 17a–17e assigned to different protection domains.

Figure 4:
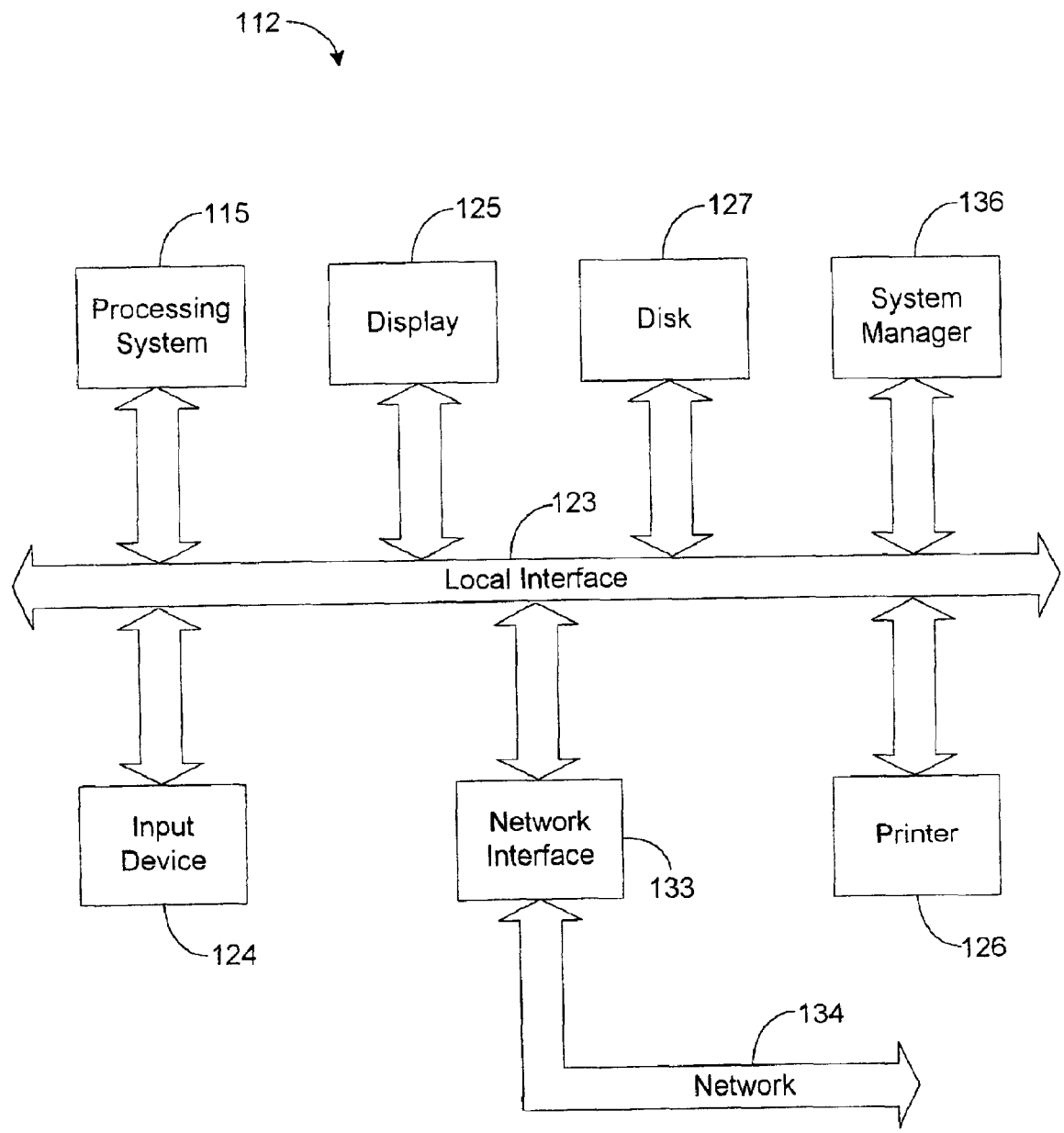
FIG. 4 is a block diagram illustrating a computer system that may be employed to implement the principles of the present invention.

FIG. 4 depicts a computer system 112 that may be utilized in implementing the present invention. As shown by FIG. 4, the computer system 112 includes a processing system 115 configured to execute instructions of computer applications that are preferably stored in memory included in the processing system 115. The processing system 115 communicates to and drives the other elements within the computer system 112 via a local interface 123, which can include one or more buses. Furthermore, an input device 124, for example, a keyboard or a mouse, can be used to input data from a user of the system 112, and screen display 125 or a printer 126 can be used to output data to the user. A disk storage mechanism 127 can be connected to the local interface 123 to transfer data to and from a nonvolatile disk (e.g., magnetic, optical, etc.). The system 112 can be connected to a network interface 133 that allows the system 112 to exchange data with a network 134.

The computer system 112 also includes a system manager 136 that is used in the preferred embodiment to control the operation of the computer system 112, as will be described in more detail hereinafter. The system manager 136 can be implemented in software, hardware, or a combination thereof Note that the system manager 136, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. For example, instructions defined by the system manager 136 can be executed by one or more processors in the processing system 115.

In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 5:
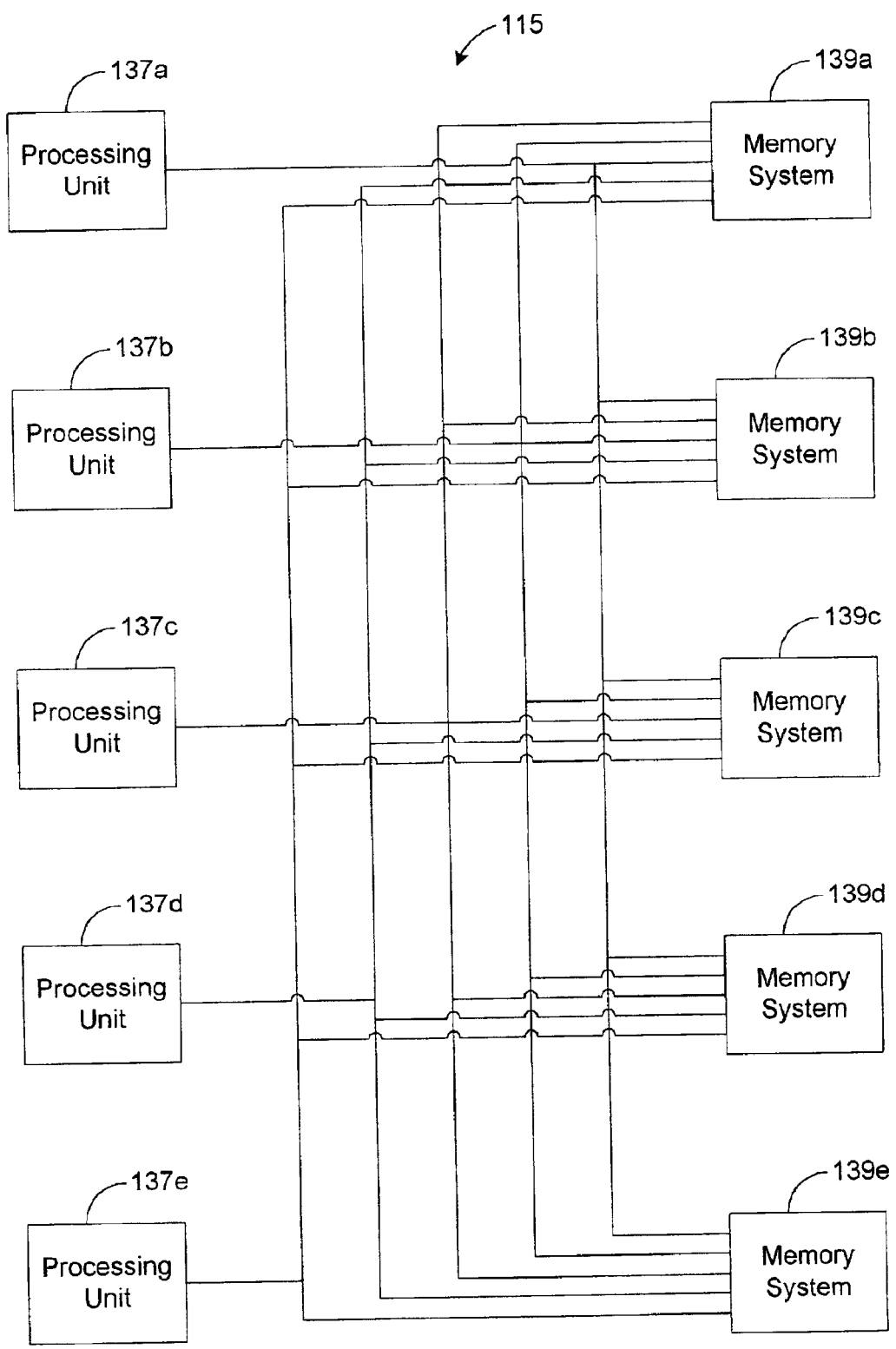
FIG. 5 is a block diagram illustrating a more detailed view of a processing system depicted in FIG. 4.
Figure 6:
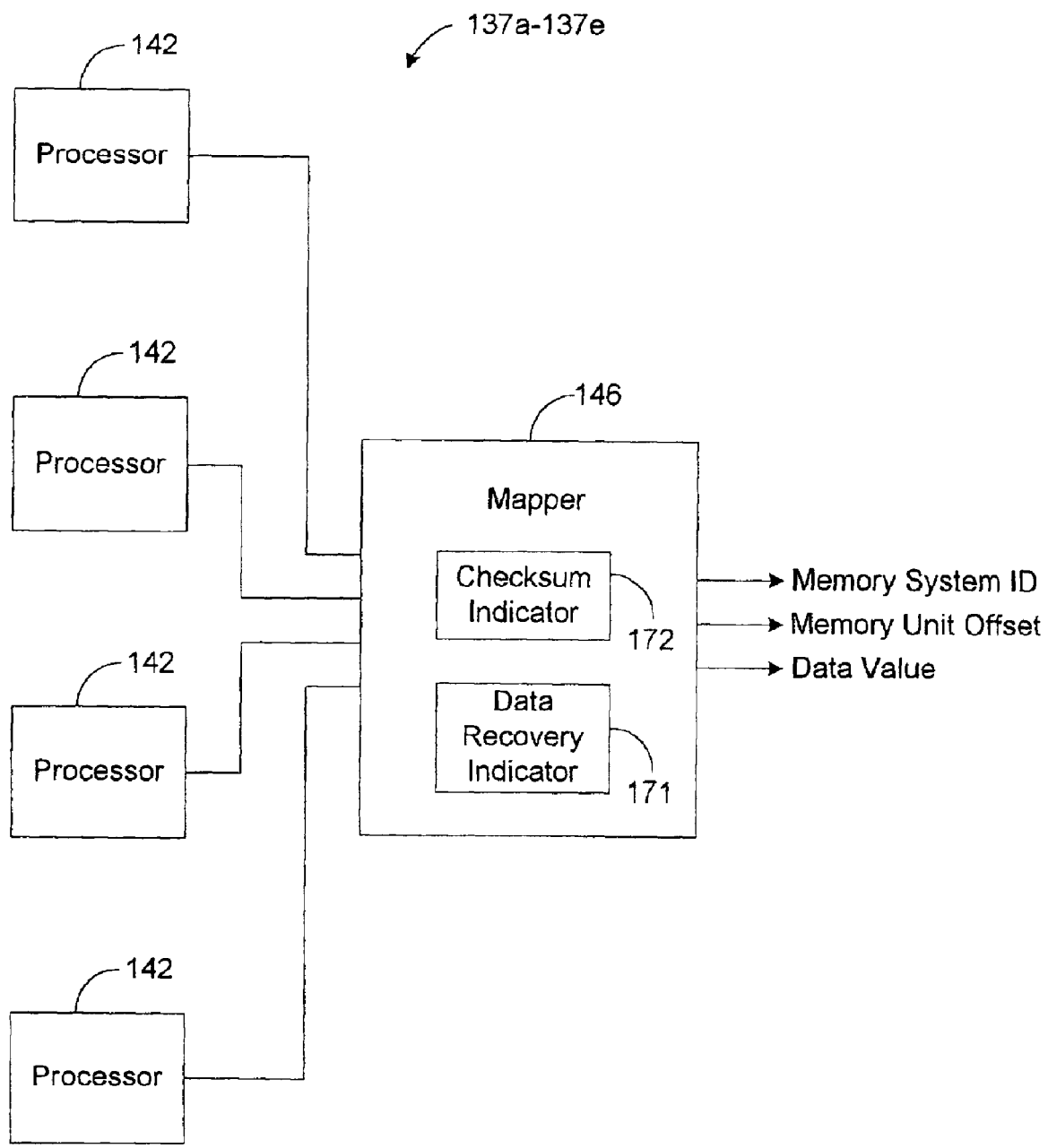
FIG. 6 is a block diagram illustrating a more detailed view of processing units depicted in FIG. 5.

As shown by FIG. 5, the processing system 115 includes a plurality of processing units 137a–137e coupled to a plurality of memory systems 139a–139e. As shown by FIG. 6, each processing unit 137a–137e includes one or more processors 142 that are configured to execute instructions via techniques well known in the art. These instructions are preferably defined by computer applications stored in one or more of the memory systems 139a–139e.

When a data value is to be stored in response to execution of an instruction by one of the processors 142, the processor 142 transmits a storage request to a mapper 146. The storage request includes the data value to be stored and a bus address indicative of where the foregoing data value is to be stored. The mapper 146 is configured to map the bus address into a memory unit address including a memory system identifier and a memory unit offset. The memory system identifier identifies one of the memory systems 139a–139e. The mapper 146 is configured to transmit a write request including the data value to be stored, the memory system identifier, and the memory unit offset to each of the memory systems 139a–139e. Note that, similar to the mapper 26 of conventional system 15, the mapper 146 preferably maps consecutive bus addresses to different memory systems 139a–139e in an interleaved fashion.

Figure 7A:
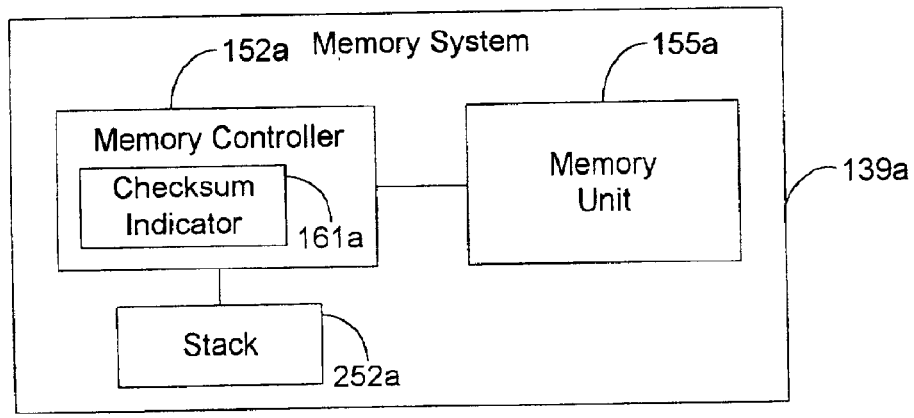
FIGS. 7A and 7B are block diagrams illustrating a more detailed view of memory systems depicted in FIG. 5.
Figure 7A:
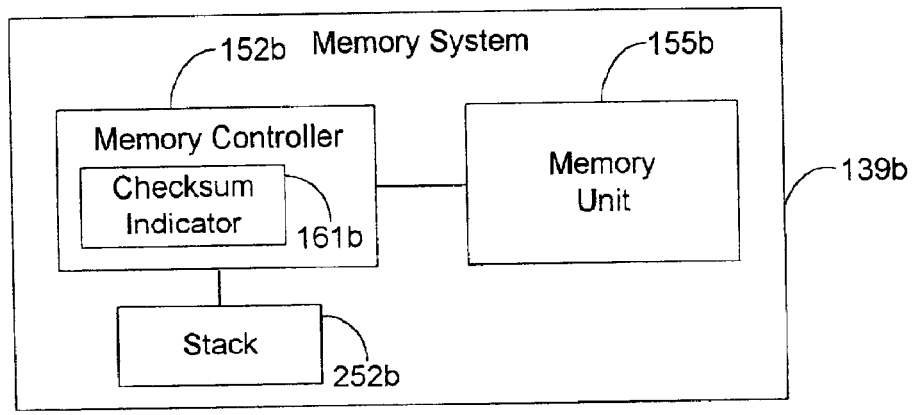
Figure 7A:
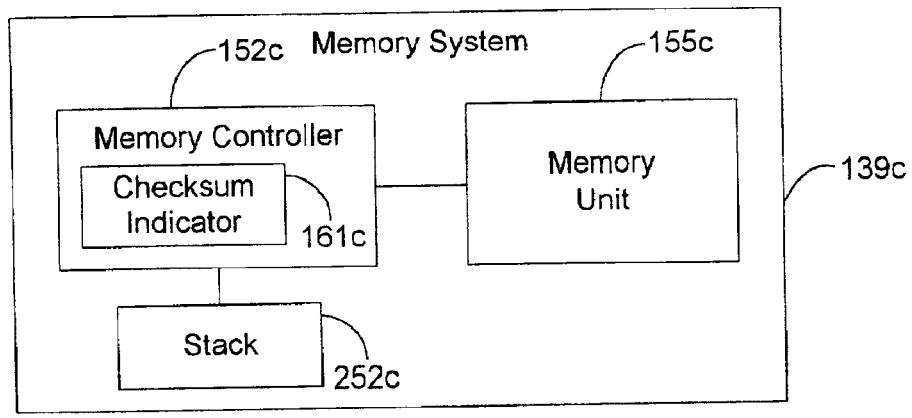
Figure 7B:
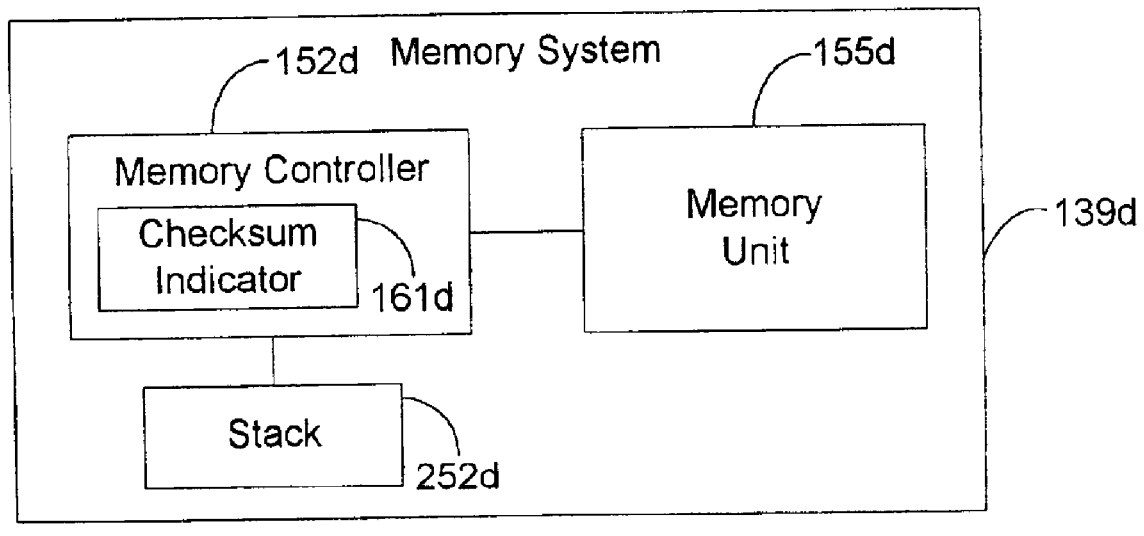
Figure 7B:
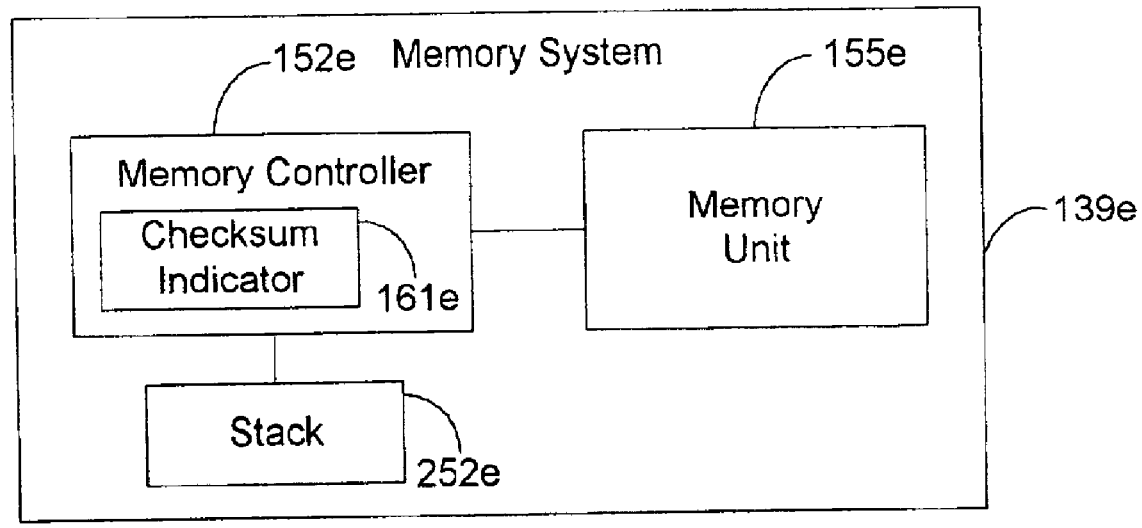

As shown by FIGS. 7A and 7B, each of the memory systems 139a–139e includes a memory controller 152a–152e, respectively, and a memory unit 155a–155e, respectively. Each of the memory units 155a–155e includes a plurality of memory locations where data can be stored and retrieved. The memory controller 152a–152e of the memory system 139a–139e identified by the aforementioned memory system identifier of the aforementioned write request is configured to store the data value to be stored (i.e., the data value received along with the memory system identifier and the memory unit offset) into the memory unit 155a–155e of the identified memory system 139a–139e based on the memory unit offset In this regard, the memory unit offset identifies a single memory location in each of the memory units 155a–155e, and the memory controller 152a–152e in the identified memory system 139a–139e is configured to store, in the foregoing memory unit 155a–155e, the received data value at the location identified by the memory unit offset.

Each bus address mapped to the same memory system 139a–139e is preferably mapped into a memory unit address having a different memory unit offset. Therefore, although a set of bus addresses may be mapped to the same memory system 139a–139e, each of the bus addresses is mapped to a unique memory unit address. Accordingly, each bus address mapped to the same memory system 139a–139e is mapped to a different location in the same memory system 139a–139e.

Through techniques similar to the techniques previously described herein, data may be retrieved From the memory units 155a–155e. In this regard, when one of the processors 142 executes an instruction to retrieve data, a retrieval request is transmitted by the processor 142 to the mapper 146 coupled to the processor 142. The retrieval request includes the bus address that indicates where the data is to be retrieved. The mapper 146 maps the bus address to a memory unit address including a memory system identifier and a memory unit offset. The memory system identifier identifies the memory system 139a–139e storing the requested data, and the memory unit offset identifies the location within the memory unit 155a–155e of the identified memory system 139a–139e where the data is actually stored.

The mapper 146 transmits a read request to each of the memory systems 139a–139e in response to the retrieval request. The read request includes the foregoing memory unit address translated from the bus address of the retrieval request. The memory controller 152a–152e of the identified memory system 139a–139e retrieves the data value in the associated memory unit 155a–155e at the location identified by the memory unit offset and transmits this data value to the requesting processing unit 137a–137e. In this regard, the memory controller 152a–152e may return the foregoing data value to the mapper 146, which transmits this data value to the requesting processing unit 137a–137e, or the memory controller 152a–152e may transmit the data value to the requesting processing unit 137a–137e without utilizing mapper 146.

Figure 8:
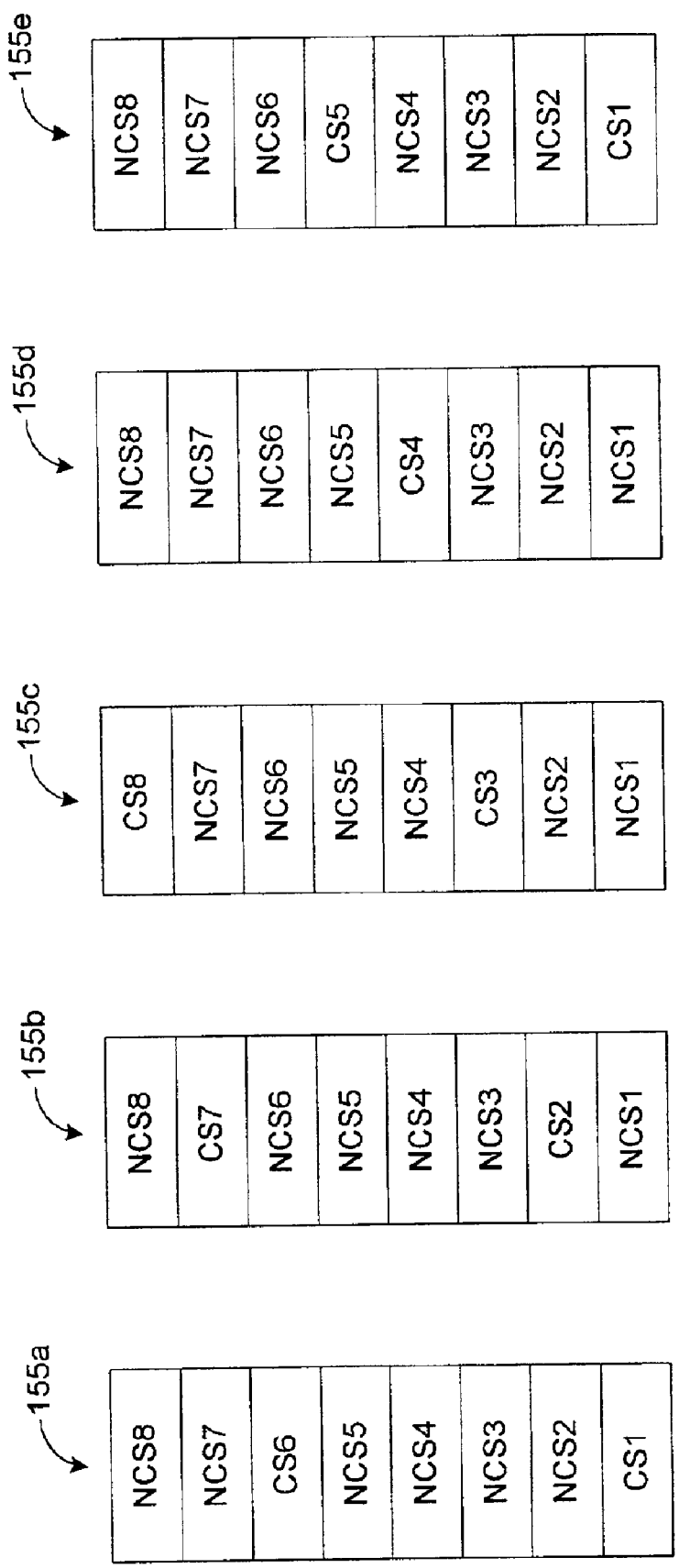
FIG. 8 is a block diagram illustrating a more detailed view of memory units depicted in FIGS. 7A and 7B.

FIG. 8 depicts a more detailed view of each of the memory units 155a–155e. In FIG. 8, checksum values or checksums are stored within portions CS1–CS8 and non-checksum values are stored within portions NCS1–NCS8. As in conventional system 15, the checksum value and the non-checksum values of the same checksum set are stored at memory locations having the same memory unit offset. In other words, each checksum value within one of the memory systems 139a–139e represents the checksum for each data value stored at the memory locations that are within the other memory systems 139a–139e and that are correlated with the same memory unit offset as the memory location of the checksum value. However, the checksums are preferably interleaved across, the different memory systems 139a–139e, as shown by FIG. 8, for example.

Referring to FIG. 8, assume that the memory locations within portion CS1 ("checksum 1") of memory unit 155a are correlated with the same memory unit offsets as the memory locations within portions NCS1 ("non-checksum 1") of memory units 155b–155e. Therefore, the checksum of the values within portions NCS1 at memory locations correlated with the same memory unit offset should be stored in portion CS1 at the memory location that is correlated with the foregoing memory unit offset. Similarly, assume that the memory locations within portions CS2–CS8 are correlated with the same memory unit offsets as the memory locations within portions NCS2–NCS8, respectively. Thus, the checksums of the values within portions NCS2–NCS8 should be stored in portions CS2–CS8, respectively. For example, the checksum of the values within portions NCS2 at memory locations correlated with the same memory unit offset should be stored in portion CS2 at the memory location that is correlated with the foregoing memory unit offset, and the checksum of the values within portions NCS3 at memory locations correlated with the same memory unit offset should be stored in portion CS3 at the memory location that is correlated with the foregoing memory unit offset.

Thus, instead of having the checksums stored within a single memory unit 43 (FIG. 3) as in conventional system 15, the checksums are stored in different memory units 155a–155e. As a result, checksum updates may be interleaved across the memory units 155a–155e. U.S. patent application Ser. No. 09/699,877, entitled "Data Storage System and Method," and filed on Oct. 30, 2000, which is incorporated herein by reference, describes in more detail how the system 115 can be configured to enable checksums to be interleaved across the memory units 155a–155e, as shown by FIG. 8. It should be noted that the techniques for performing backward error recovery (BER), which will be described in further detail hereinafter, may be employed when the checksums are stored in the same memory unit 43 (FIG. 3), as described for conventional system 15.

Figure 9:
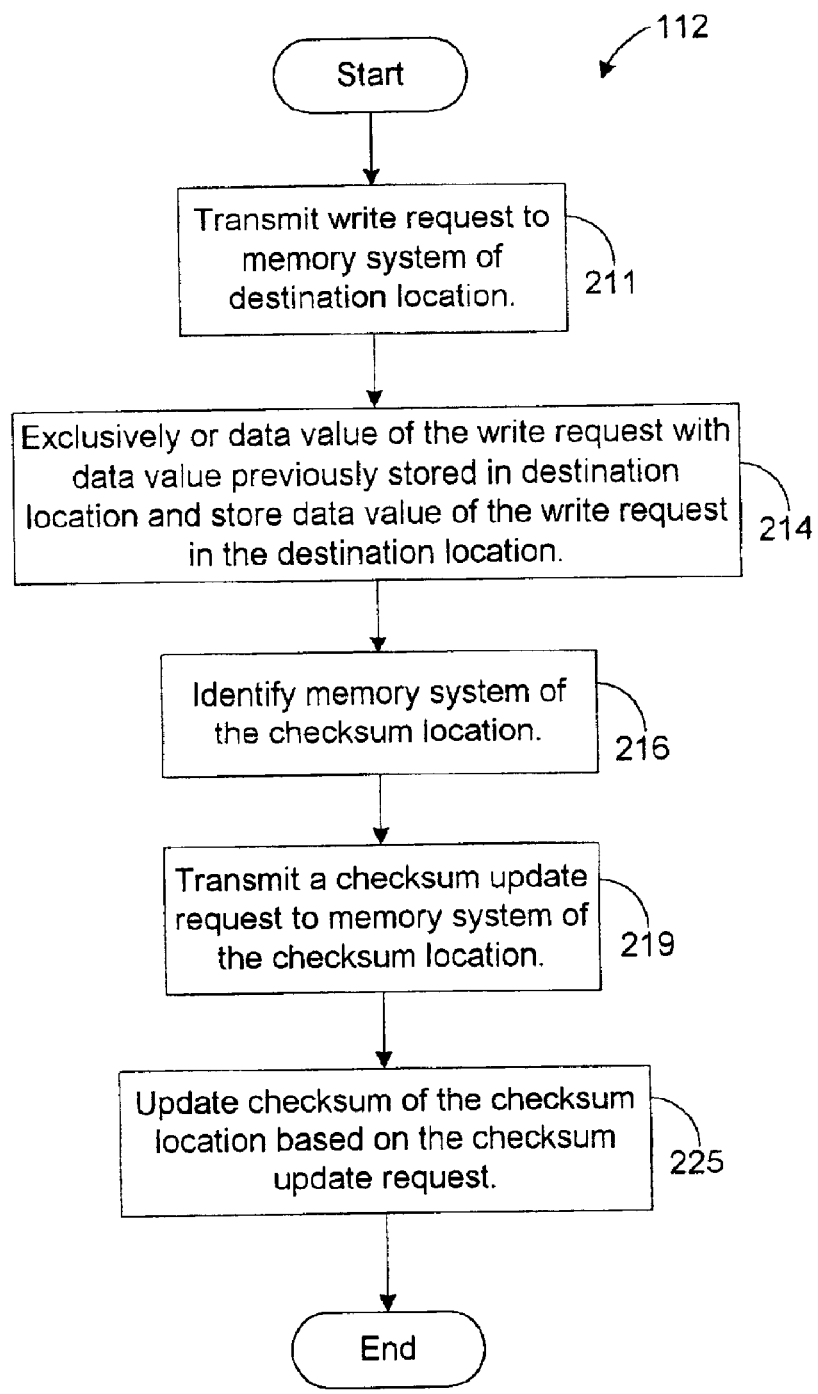
FIG. 9 is a flow chart illustrating the architecture and functionality of the computer system of FIG. 4 in storing a data value to one of the memory systems of FIG. 5.

To better illustrate how checksums are maintained within memory units 155a–155e, assume that memory system 139b receives, in block 211 of FIG. 9, a write request for storing a data value at one of the memory locations in portion NCS1 of memory unit 155b. As described hereinbefore, the one memory location (referred to hereafter as the "destination") within portion NCS1 should be correlated with a particular memory unit offset. The checksum of the value already stored at the destination before the occurrence of the write request should be stored in portion CS1 of memory unit 155a at the memory location (referred to hereafter as the "checksum location") correlated with the same memory unit offset.

In response to the write request, the memory controller 152b exclusively ors the data value of the write request (i.e., the data value to be stored) with the data value previously stored in the destination and then stores, in the destination, the data value of the write request, as shown by block 214 of FIG. 9. As depicted by blocks 216 and 219 of FIG. 9, the result of the exclusive or operation is then transmitted by the memory controller 152b in a second write request (a "checksum update request"), which identifies the memory controller 152a of the memory system 139a that includes the checksum location. In this regard, this checksum update request includes at least a memory system identifier identifying the memory system 139a, the result of the exclusive or operation, and the memory unit offset correlated with the destination.

This checksum update request is transmitted to each of the other memory systems 139a, 139c–139e by the memory controller 152b. In response to the checksum update request, the memory controller 152a updates, in block 225 of FIG. 9, the checksum stored in the checksum location. More specifically, the memory controller 152a in block 225 exclusively ors the checksum stored at the checksum location with the exclusive or result transmitted from memory controller 152b in block 219 of FIG. 9. The result of the exclusive or operation performed by memory controller 152a is then stored in the checksum location. As a result, the checksum at the checksum location has been updated for the data value that was stored in the destination in block 214 of FIG. 9.

Once a data value stored in one of the memory systems 139a–139e is lost (e.g., when the memory system 139a–139e storing the data value fails), the lost data value may be recovered by utilizing the other data values of the lost data value's checksum set. In this regard, assume that each memory system 139a–139e is operational until a failure occurs in memory system 139b. Further assume that the mapper 146 receives a storage or a retrieval request for accessing the data value stored at the aforementioned destination location in memory system 139b. Since the memory system 139b is no longer operational, it is not possible for the received request to be satisfied. Moreover, the data value at the destination location has been lost.

However, it is possible for the lost data value to be recovered via the checksum stored in the checksum location (i.e., the location in memory unit 155a having the same memory unit offset as the destination location). More specifically, the lost data value can be recovered by exclusively oring the checksum at the checksum location with the data values presently stored in active memory systems 139c–139e at locations having the same memory unit offset as the checksum and destination location. In other words, the lost data value can be recovered by exclusively oring the other non-checksum values of the lost data value's checksum set with the checksum of the checksum set. Note that the process of maintaining checksums and utilizing checksums to recover lost data values is described in more detail in copending and commonly assigned U.S. patent application Ser. No. 09/773,124, entitled "System and Method of Building a Checksum" and filed Jan. 31, 2001, and copending and commonly assigned U.S. patent application Ser. No. 09/759,853, entitled "System and Method for Utilizing Checksums to Recover Data" and filed Jan. 12, 2001, which are both incorporated herein by reference.

To enable backward error recovery (BER) according to the techniques of the present invention, each of the memory systems 139a–139e respectively includes one or more stacks 252a–252e, as shown by FIGS. 7A and 7B. More specifically, each memory system 139a–139e includes at least one stack 252a–252e for each protection domain associated with the memory system 139a–139e. As known in the art, a "stack" is a last in, first out (LIFO) device. Furthermore, a protection domain is "associated" with a memory system 139a–139e when at least one memory location within the memory system 139a–139e is assigned to the protection domain. Thus, if one of the memory systems 139a–139e is associated with three protection domains, then this one memory system 139a–139e should include at least three stacks 252a–252e.

Each time a memory controller 152a–152e receives a request from mapper 146 to write a new data value to a data location, referred to as the "destination," of its respective memory unit 155a–155e, the memory controller 152a–152e preferably exclusively ors the new data value to be stored in the destination with the old data value previously stored in the destination (i.e., the data value overwritten by the new data value). As described above, the memory controller 152a–152e then transmits the result of this exclusive or operation in a checksum update request to the memory system 139a–139e storing the checksum of the checksum set associated with the destination. In the preferred embodiment, the foregoing memory controller 152a–152e includes a "location identifier" in the checksum update request. The location identifier identifies the memory system 139a–139e of the destination and the memory unit offset of the destination. In addition to transmitting the checksum update request, the foregoing memory controller 152a–152e pushes the old data value (i.e., the overwritten data value), along with the foregoing location identifier, onto one of the stacks in the memory system 139a–139e of the foregoing memory controller 152a–152e.

In this regard, each of the stacks in the memory system 139a–139e of the forgoing memory controller 139a–139e corresponds to a different one of the protection domains that are associated with the memory system 139a–139e of the foregoing memory controller 139a–139e. Moreover, the foregoing memory controller 139a–139e is designed to push the old data value (i.e., the overwritten data value), along with the foregoing location identifier, onto the stack that corresponds to the protection domain of the destination.

The memory controller 152a–152e, referred to hereafter as the "checksum controller," of the memory system 139a–139e storing the checksum of the old data value (i.e., the overwritten data value) receives the checksum update request. In response, the checksum controller updates the foregoing checksum according to the techniques previously described such that the updated checksum now represents the checksum of the new data value instead of the old data value. The checksum controller then pushes the exclusive or result and the location identifier included in the checksum update request onto one of the stacks of the checksum controller's memory system 139a–139e. More specifically, each of the stacks of the checksum controller's memory system 139a–139e should correspond to a different protection domain, and the checksum controller pushes the exclusive or result and the location identifier onto the stack corresponding to the same protection domain as the destination.

To better illustrate the above process for enabling BER, assume that memory controller 139c receives a request to write a new data value to a particular location within memory unit 155c. In response, the memory controller 139c is configured to exclusively or the new data value with the data value, the "old data value," presently stored in the particular location and to then store the new data value in the particular location, thereby overwriting the old data value.

Assuming that the checksum of the old data value is stored in memory unit 155d, the memory controller 139c is then designed to transmit, to memory system 129d in a checksum update request, the result of the foregoing exclusive or operation along with a location identifier identifying the particular location. In addition, the memory controller 152c is also designed to push the old data value, along with a location identifier identifying the particular location, onto the stack 252c that corresponds to the same protection domain as the particular location.

The memory controller 152d, in response to the checksum update request, updates the checksum in memory unit 155d at the location having the same memory unit offset as the particular location of memory unit 155c. The memory controller 152d also pushes the exclusive or result and the location identifier of the checksum update request onto the stack 252d of the memory system 139d that corresponds to the same protection domain assigned to the particular location.

By performing the above described process for each data value stored in one of the memory systems 139a–139e, BER according to the present invention is enabled. In this regard, to perform BER for a particular protection domain, a memory controller 139a–139e successively retrieves each data value and its associated location identifier from its stack that corresponds to the particular protection domain. If the location identifier of a retrieved data value identifies the same memory system that includes the memory controller 152a–152e performing the BER, then the memory controller 152a–152e overwrites the value at the location identified by the location identifier with the data value retrieved from the stack. If the location identifier instead identifies another memory system 139a–139e that is now inoperable, then the memory controller 152a–152e exclusively ors the retrieved data value with the value presently stored in the location identified by the memory unit offset of the location identifier. If the location identifier instead identifies another operable memory system 139a–139e, then the memory controller 152a–152e discards the retrieved value.

After emptying the stack according to the techniques described above, the data locations within the memory unit 155a–155e of the memory controller 152a–152e associated with the particular protection domain should exhibit the values that existed when the system was in the most recent checkpoint state. In other words, once the memory controller 152a–152e has processed the values within the foregoing stack, the memory controller 152a–152e has completed the BER for the particular protection domain. To better illustrate the foregoing process, an example BER process will be described hereafter in the Operation section.

Operation

The preferred use and operation of the processing system 115 and associated methodology are described hereafter.

Assume that only memory systems 139a–139d of FIGS. 7A and 7B are operational and that each memory unit 155a–155d includes two memory locations being used to respectively store two data values. Note that the memory units 155a–155d may include a larger number of memory locations and that only two memory locations for each memory unit 155a–155d are described hereafter for simplification purposes. Further assume that one of the memory locations in each memory unit 155a–155d has a memory unit offset of "0000" and that the other memory location in each memory unit 155a–155d has a memory unit offset of "0001." Also assume that the four data values stored at the "0000" memory locations of memory units 155a–155d define a checksum set with the checksum value of this checksum set stored in memory unit 155d, and assume that the four data values stored at the 0001 memory locations of memory units 155a–155d define another checksum set with the checksum value of this checksum set stored in memory unit 155d.

Initially, the memory units 155a–155d are in a checkpoint state, which is a state that may be partially or entirely returned to at a later time by performing a BER. In this checkpoint state, as shown by FIG. 10, a data value, represented as "A0," is stored in the memory unit 155a at the location having memory unit offset "0000," and a data value, represented as "B0," is stored in the memory unit 155a at the location having memory unit offset "0001." In addition, a data value, represented as "A2," is stored in the memory unit 155b at the location having memory unit offset "0000," and a data value, represented as "B2," is stored in the memory unit 155a at the location having memory unit offset "0001."

Further, a data value, represented as "Aa," is stored in the memory unit 155c at the location having memory unit offset "0000," and a data value, represented as "Bb," is stored in the memory unit 155c at the location having memory unit offset "0001."

Figure 10:
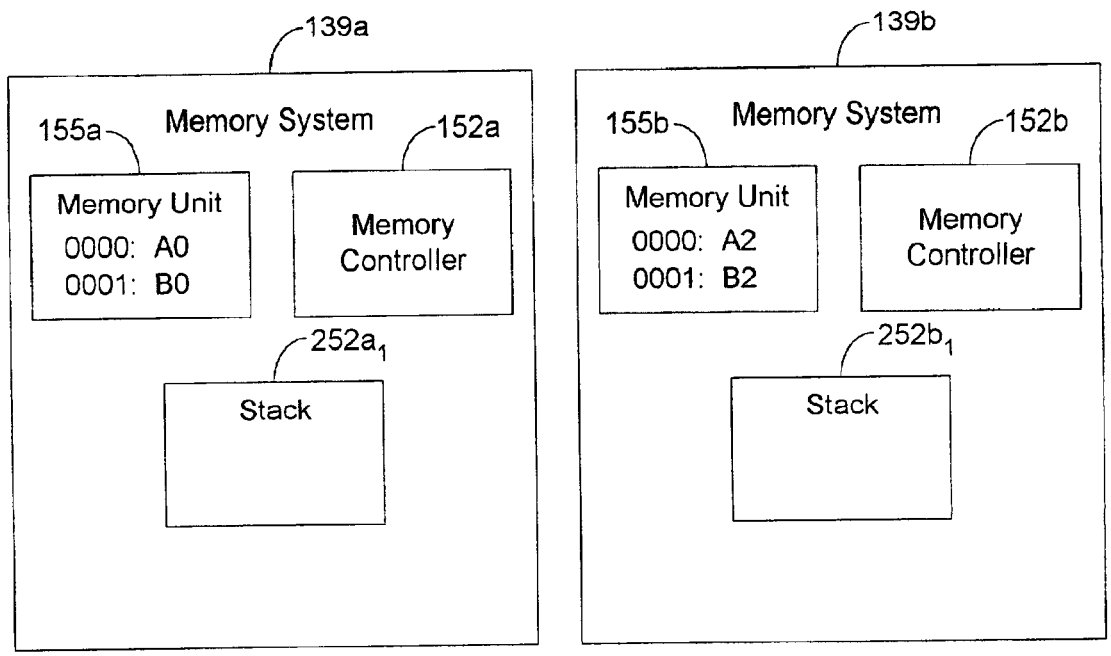
FIG. 10 is a block diagram illustrating memory systems of FIGS. 7A and 7B while the memory systems are in a checkpoint state.
Figure 10:
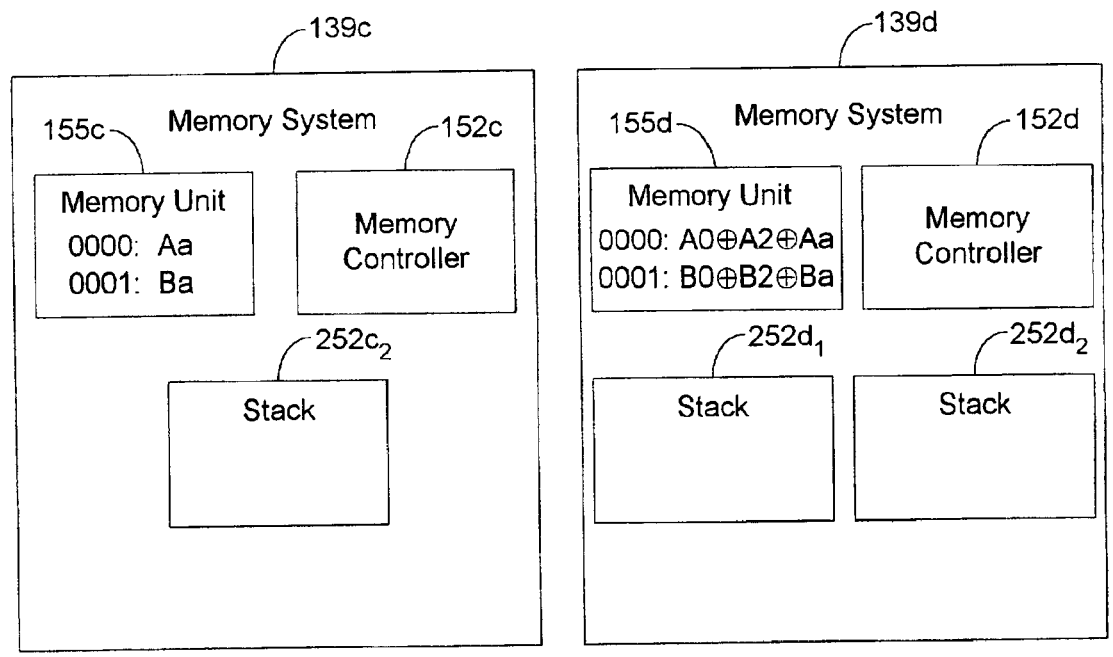

Since the checksums of the checksum sets for memory locations "0000" and "0001" are stored in memory unit 155d, the checksum of the values in memory units 155a–155c at the "0000" locations should be stored in memory unit 155d at the location having memory unit offset "0001." As shown by FIG. 10, the value of this checksum should be equal to "A0" exclusively ored with "A2" and "Aa." Also shown by FIG. 10, the checksum of the values in memory units 155a–155c at the "0001" locations should be stored in memory unit 155d at the location having memory unit offset "0001". The value of this checksum should be equal to "B0" exclusively ored with "B2" and "Ba."

Assume that both memory locations in memory unit 155a and both memory locations in memory unit 155b are assigned to the same protection domain, referred to hereafter as "protection domain 1." Further assume that both memory locations in memory unit 155c are assigned to another protection domain, referred to hereafter as "protection domain 2."

Since memory unit 155a includes at least one memory location assigned to protection domain 1, the memory system 139a should include at least one stack $252a_1$, which is associated with protection domain 1 and which may be used to perform BER for protection domain 1, as will be described hereafter. If the memory system 139a were to include memory locations assigned to protection domain 2, then the memory system 139a would include another stack (not shown), which would be associated with protection domain 2 and which could be used to perform BER for protection domain 2.

Since memory unit 155b includes at least one memory location assigned to protection domain 1, the memory system 139b should include at least one stack $252b_1$, which is associated with protection domain 1 and which may be used to perform BER for protection domain 1, as will be described hereafter. If the memory system 139b were to include memory locations assigned to protection domain 2, then the memory system 139b would include another stack (not shown), which would be associated with protection domain 2 and which could be used to perform BER for protection domain 2.

Since memory unit 155c includes at least one memory location assigned to protection domain 2, the memory system 139c should include at least one stack $252c_2$, which is associated with protection domain 2 and which may be used to perform BER for protection domain 2. If the memory system 139c were to include memory locations assigned to protection domain 1, then the memory system 139c would include another stack (not shown), which would be associated with protection domain 1 and which could be used to perform BER for protection domain 1.

Since memory unit 155d includes memory locations that store the checksums of values from both protection domain 1 and protection domain 2, the memory system 139d includes one stack $252d_1$ associated with protection domain 1 and one stack $252d_2$ associated with protection domain 2.

Assume that memory controller 152a receives a request to write a data value, represented as "A1," to memory location "0000" of memory unit 155a. In response, the memory controller 152a exclusively ors "A1" with "A0" (i.e., the value presently stored in location "0000" of memory unit 155a). The memory controller 152a then transmits the result (i.e., "A0⊕A1") of the foregoing exclusive or operation to memory controller 152d so that the appropriate checksum update can be performed according to techniques previously described.

In this regard, the memory controller 152d exclusively ors the received result (i.e., "A0⊕A1") with the checksum presently stored in location "0000" of memory unit 155d. The memory controller 152d also stores the result (i.e., "A0⊕A1") received from memory system 139a into one of the stacks of the memory system 139d along with a location identifier, represented as "$Id_{A0000}$," that identifies the memory system 139a from which the result was transmitted. "$Id_{A0000}$" also identifies the memory unit offset (i.e., "0000") associated with the memory location from which the foregoing result was derived. Note that "$Id_{A0000}$" may be included in the foregoing checksum update request.

Figure 11:
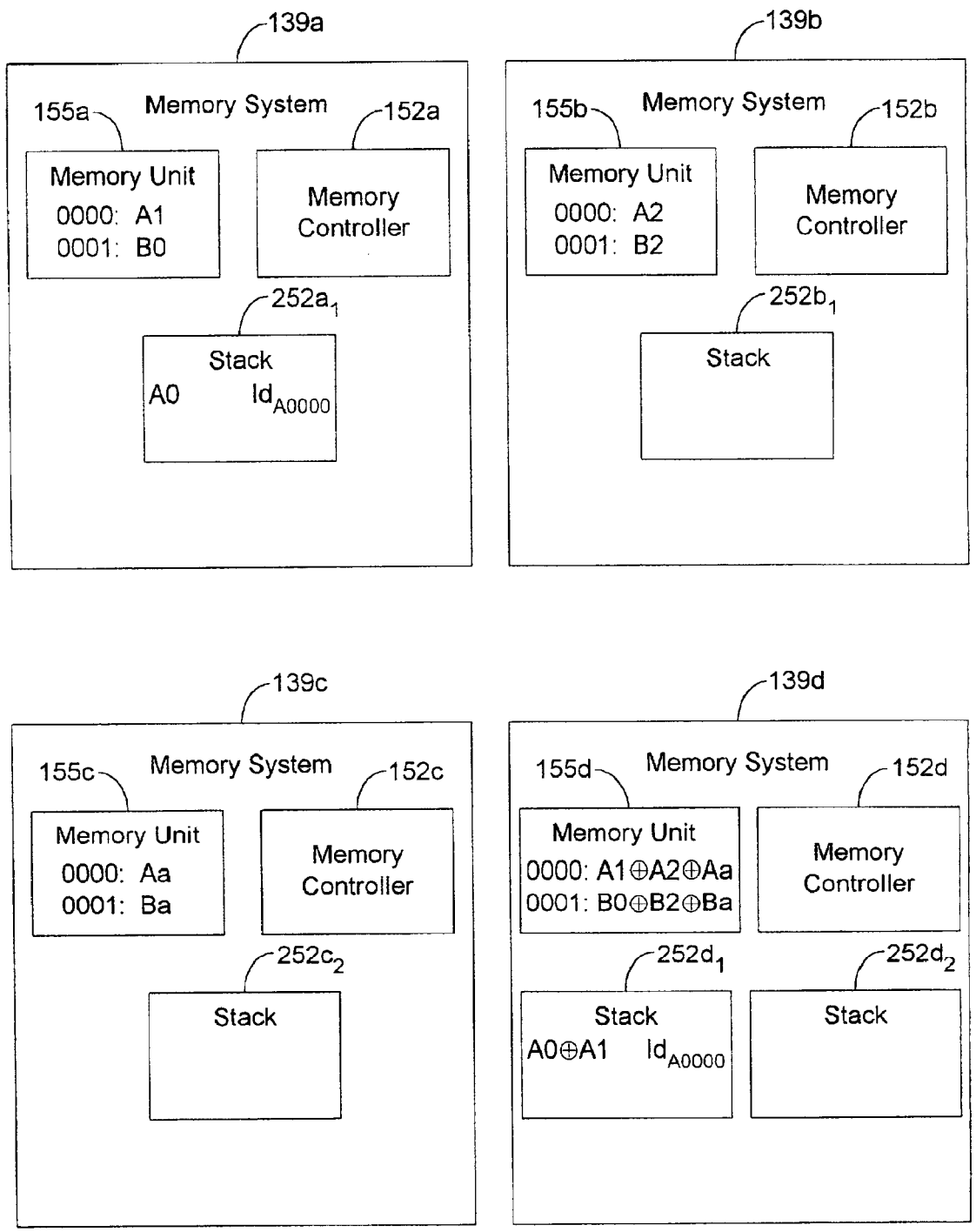
FIG. 11 is a block diagram illustrating the memory systems of FIG. 10 after a value of "A1" has been written to one of the memory systems.

Since the result received from memory system 139a is based on values in protection domain 1, the memory controller 152d preferably stores the result and "$Id_{A0000}$" in the stack $252d_1$ associated with protection domain 1. As a result, the value "A1⊕A2⊕Aa," which is the checksum of the checksum set correlated with memory locations "0000," should be stored in memory location "0000" of memory unit 155d, and the value "A0⊕A1" along with "$Id_{A0000}$" should collectively be the top value in stack $252d_1$, as shown by FIG. 11. Note that the "top value" of a stack, as used herein, is the most recent set of values stored to the stack. Thus, the current top value should always be the next set of values to be pulled from the stack.

In addition to transmitting the value "A0⊕A1" to memory controller 152d, the memory controller 152a also stores "A1" in memory location "0000" of memory unit 155a. Since this operation replaces "A0" with "A1," the memory controller 152a pushes "A0" along with location identifier "$Id_{A0000}$" onto the stack $252a_1$. As described above, "$Id_{A0000}$" includes or identifies the memory unit offset (i.e., "0000") associated with the memory location in which "A0" was stored. Once stacks $252a_1$, and $252d_1$ and memory locations "0000" of memory units 155a and 155d have been updated as described above, the write operation for writing "A1" is complete, and the state of memory systems 139a–139d should appear as shown by FIG. 11.

After the foregoing write request for writing "A1" is received by memory controller 152a, assume that memory controller 152b receives a request to write a data value, represented as "A3," to memory location "0000" of memory unit 155b. In response, the memory controller 152b exclusively ors "A3" with "A2" (i.e., the value presently stored in location "0000" of memory unit 155b). The memory controller 152b then transmits, in a checksum update request, the result (i.e., "A2⊕A3") of the foregoing exclusive or operation to memory controller 152d so that the appropriate checksum update can be performed according to techniques previously described.

In this regard, the memory controller 152d exclusively ors the received result (i.e., "A2⊕A3") with the checksum presently stored in location "0000" of memory unit 155d. The memory controller 152d also stores the result (i.e., "A2–A3") received from memory system 139b into one of the stacks of the memory system 139d along with a location identifier, represented as "$Id_{B0000}$," that identifies the memory system 139b from which the result was transmitted. "$Id_{B0000}$" also identifies the memory unit offset (i.e., "0000") associated with the memory location from which the foregoing result was derived. Note that "$Id_{B0000}$" may be included in the foregoing checksum update request.

Figure 12:
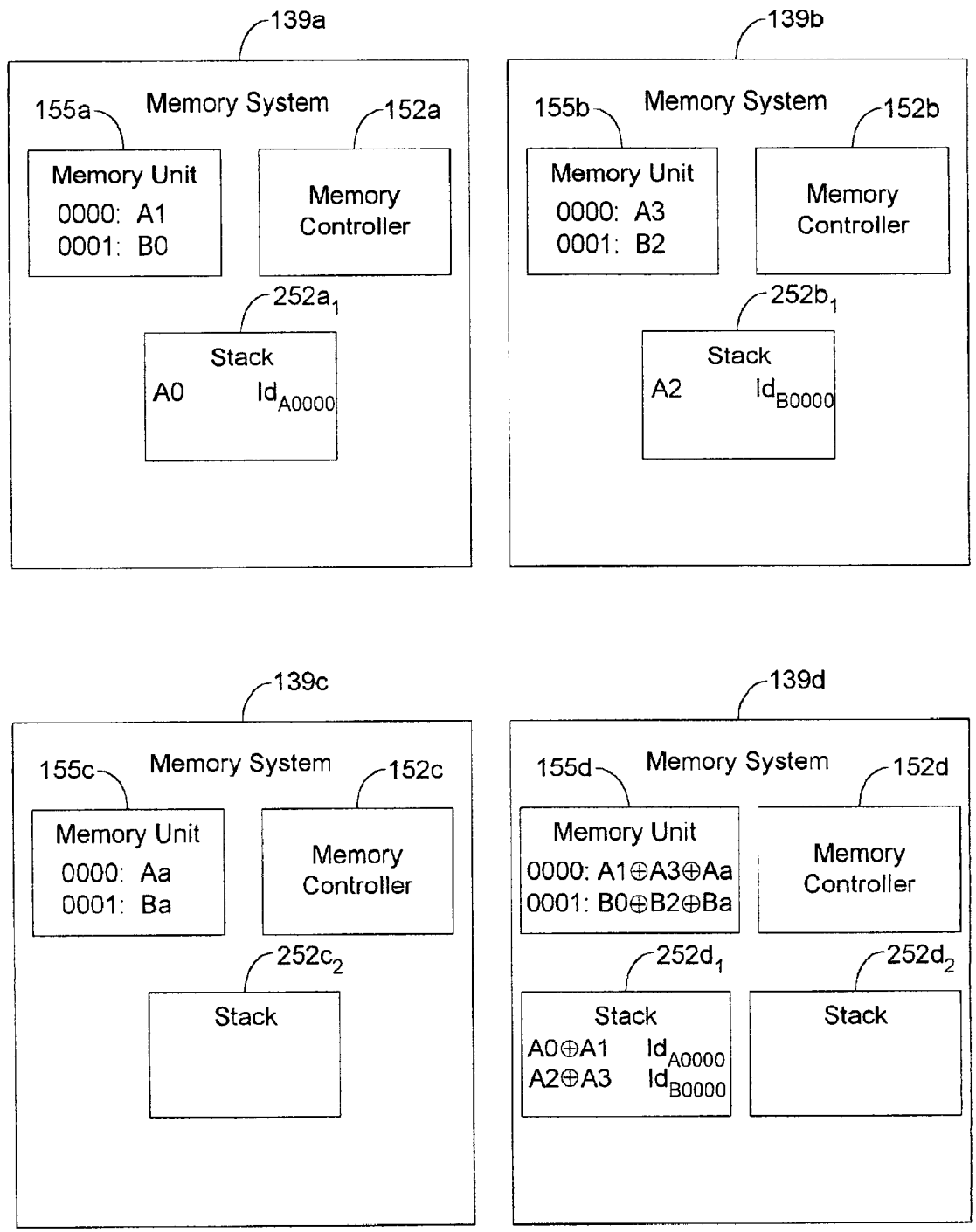
FIG. 12 is a block diagram illustrating the memory systems of FIG. 11 after a value of "A3" has been written to one of the memory systems.

Since the result received from memory system 139b is based on values in protection domain 1, the memory controller 152d preferably stores the result and "$Id_{B0000}$" in the stack $252d_1$ associated with protection domain 1. As a result, the value "A1⊕A3⊕Aa," which is the checksum of the checksum set correlated with memory locations "0000," should be stored in memory location "0000" of memory unit 155d, and the value "A2⊕A3" along with "$Id_B0000$" should collectively be the top value in stack $252d_1$, as shown by FIG. 12.

In addition to transmitting the value "A2⊕A3" to memory controller 152d, the memory controller 152b also stores "A3" in memory location "0000" of memory unit 155b. Since this operation replaces "A2" with "A3," the memory controller 152b pushes "A2" along with location identifier "$Id_{B0000}$" onto the stack $252b_1$. As described above, "$Id_{B0000}$" includes or identifies the memory unit offset (i.e., "0000") associated with the memory location in which "A3" was stored. Once stacks $252b_1$ and $252d_1$ and memory locations "0000" of memory units 155b and 155d have been updated as described above, the write operation for writing "A3" is complete, and the state of memory systems 139a–139d should appear as shown by FIG. 12.

After the foregoing write request for writing "A3" is received by memory controller 152b, assume that memory controller 152c receives a request to write a data value, represented as "Ab," to memory location "0000" of memory unit 155c. In response, the memory controller 152c exclusively ors "Ab" with "Aa" (i.e., the value presently stored in location "0000" of memory unit 155c). The memory controller 152c then transmits, in a checksum update request, the result (i.e., "Aa⊕Ab") of the foregoing exclusive or operation to memory controller 152d so that the appropriate checksum update can be performed according to techniques previously described.

In this regard, the memory controller 152d exclusively ors the received result (i.e., "Aa⊕Ab") with the checksum presently stored in location "0000" of memory unit 155d. The memory controller 152d also stores the result (i.e., "Aa⊕Ab") received from memory system 139c into one of the stacks of the memory system 139d along with a location identifier, represented as "$Id_{C0000}$," that identifies the memory system 139c from which the result was transmitted. "$Id_{C0000}$" also identifies the memory unit offset (i.e., "0000") associated with the memory location from which the foregoing result was derived. Note that "$Id_{C0000}$" may be included in the foregoing checksum update request.

Figure 13:
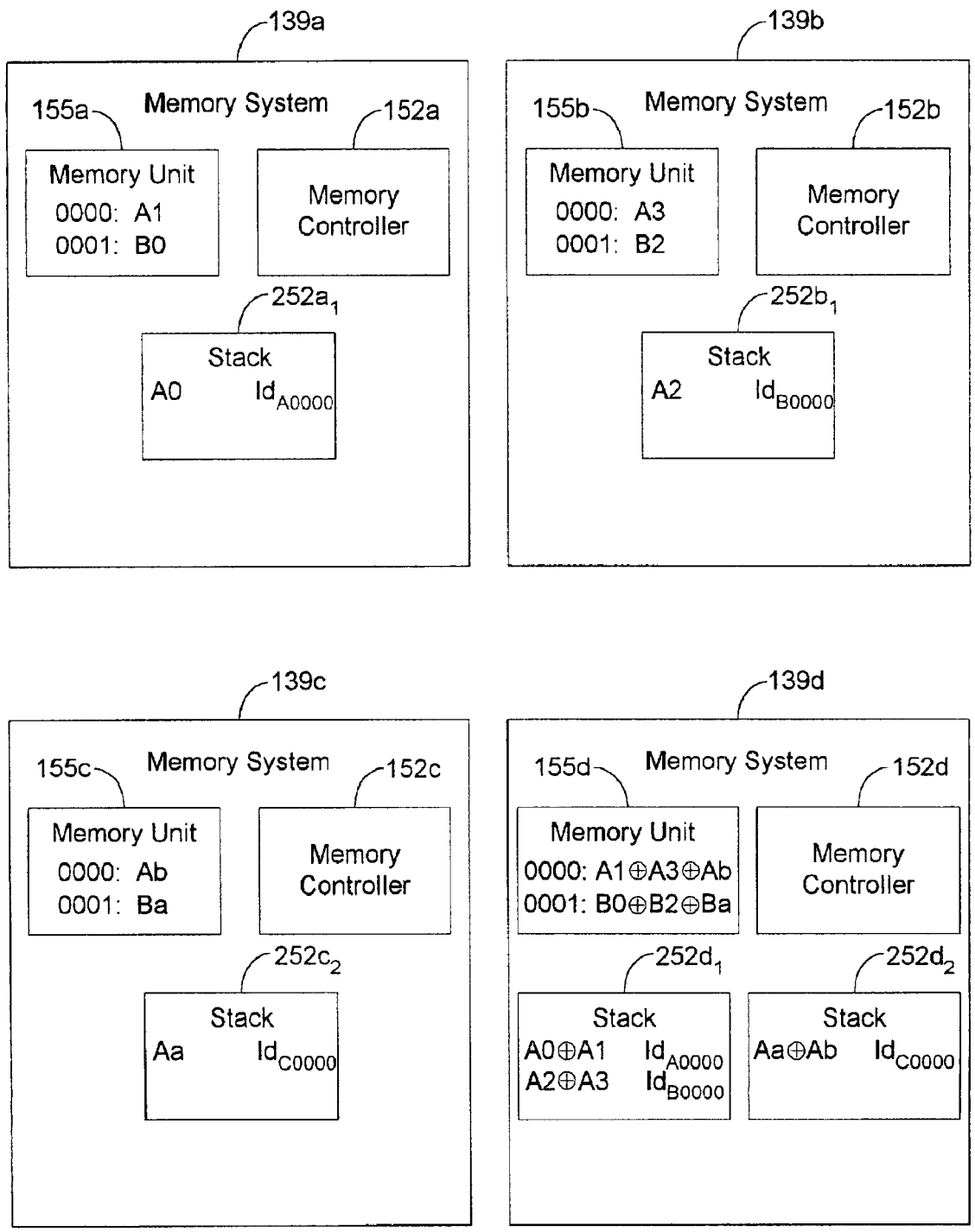
FIG. 13 is a block diagram illustrating the memory systems of FIG. 12 after a value of "Ab" has been written to one of the memory systems.

Since the result received from memory system 139c is based on values in protection domain 2, the memory controller 152d preferably stores this result and "$Id_{C0000}$" in the stack $252d_2$ associated with protection domain 2. As a result, the value "A1⊕A3⊕Ab," which is the checksum of the checksum set correlated with memory locations "0000," should be stored in memory location "0000" of memory unit 155d, and the value "Aa⊕Ab" along with "$Id_{C0000}$" should collectively be the top value in stack $252d_2$, as shown by FIG. 13.

In addition to transmitting the value "Aa⊕Ab" to memory controller 152d, the memory controller 152c also stores "Ab" in memory location "0000" of memory unit 155c. Since this operation replaces "Aa" with "Ab," the memory controller 152c pushes "Aa" along with location identifier "$Id_{C0000}$" onto the stack $252c_2$. As described above, "$Id_{C0000}$" includes or identifies the memory unit offset (i.e., "0000") associated with the memory location in which "Ab" was stored. Once stacks $252c_2$ and $252d_2$ and memory locations "0000" of memory units 155c and 155d have been updated as described above, the write operation for writing "Ab" is complete, and the state of memory systems 139a–139d should appear as shown by FIG. 13.

After the foregoing write request for writing "Ab" is received by memory controller 152c, assume that memory controller 152a receives a request to write a data value, represented as "A4," to memory location "0000" of memory unit 155a. In response, the memory controller 152a exclusively ors "A4" with "A1" (i.e., the value presently stored in location "0000" of memory unit 155a). The memory controller 152a then transmits, in a checksum update request, the result (i.e., "A1⊕A4") of the foregoing exclusive or operation to memory controller 152d so that the appropriate checksum update can be performed according to techniques previously described.

In this regard, the memory controller 152d exclusively ors the received result (i.e., "A1⊕A4") with the checksum presently stored in location "0000" of memory unit 155d. The memory controller 152d also stores the result (i.e., "A1⊕A4") received from memory system 139a into one of the stacks of the memory system 139d along with a location identifier, represented as "$Id_{A0000}$," that identifies the memory system 139a from which the result was transmitted. "$Id_{A0000}$" also identifies the memory unit offset (i.e., "0000") associated with the memory location from which the foregoing result was derived. Note that "$I_{A000}$" may be included in the foregoing checksum update request.

Figure 14:
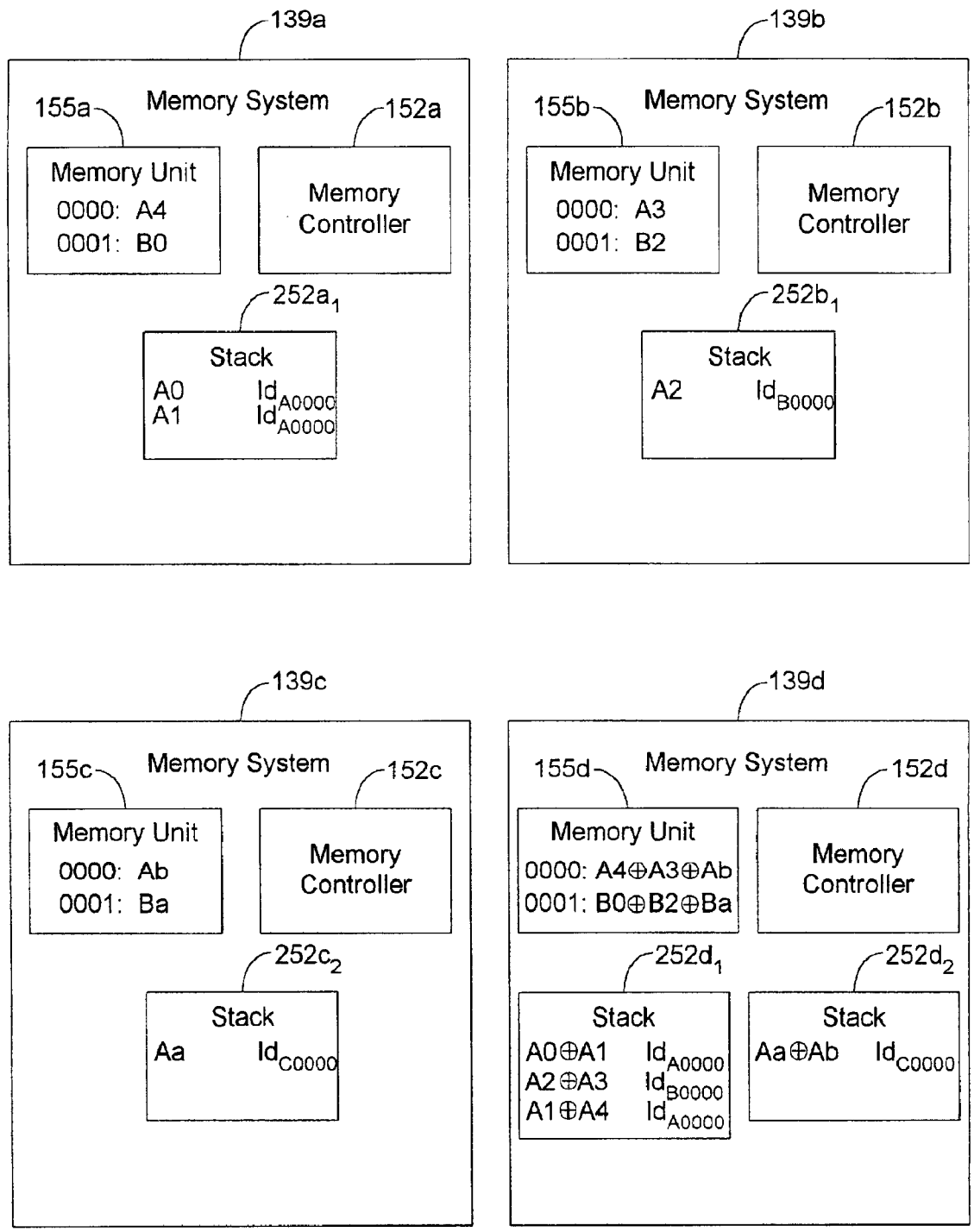
FIG. 14 is a block diagram illustrating the memory systems of FIG. 13 after a value of "A4" has been written to one of the memory systems.

Since the result received from memory system 139a is based on values in protection domain 1, the memory controller 152d preferably stores this result and "$Id_{A0000}$" in the stack $252d_1$ associated with protection domain 1. As a result, the value "A4⊕A3⊕Ab," which is the checksum of the checksum set correlated with memory locations "0000," should be stored in memory location "0000" of memory unit 155d, and the value "A1+A4" along with "$Id_{A0000}$" should collectively be the top value in stack $252d_1$, as shown by FIG. 14.

In addition to transmitting the value "A1⊕A4" to memory controller 152d, the memory controller 152a also stores "A4" in memory location "0000" of memory unit 155a. Since this operation replaces "A1" with "A4," the memory controller 152a pushes "A1" along with location identifier "$Id_{A0000}$" onto the stack $252a_1$. As described above, "$Id_{A0000}$" includes or identifies the memory unit offset (i.e., "0000") associated with the memory location in which "A4" was stored. Once stacks $252a_1$ and $252d_1$ and memory locations "0000" of memory units 155a and 155d have been updated as described above, the write operation for writing "A4" is complete, and the state of memory systems 139a–139d should appear as shown by FIG. 14.

After the foregoing write request for writing "A4" is received by memory controller 152a, assume that memory controller 152a receives a request to write a data value, represented as "A5," to memory location "0000" of memory unit 155a. In response, the memory controller 152a exclusively ors "A5" with "A4" (i.e., the value presently stored in location "0000" of memory unit 155a). The memory controller 152a then transmits, in a checksum update request, the result (i.e., "A4⊕A5") of the foregoing exclusive or operation to memory controller 152d so that the appropriate checksum update can be performed according to techniques previously described.

In this regard, the memory controller 152d exclusively ors the received result (i.e., "A4⊕A5") with the checksum presently stored in location "0000" of memory unit 155d. The memory controller 152d also stores the result (i.e., "A4⊕A5") received from memory system 139a into one of the stacks of the memory system 139d along with a location identifier, represented as "$Id_{A0000}$," that identifies the memory system 139a from which the result was transmitted. "$Id_{A0000}$" also identifies the memory unit offset (i.e., "0000") associated with the memory location from which the foregoing result was derived. Note that "$Id_{A000}$" may be included in the checksum update request.

Figure 15:
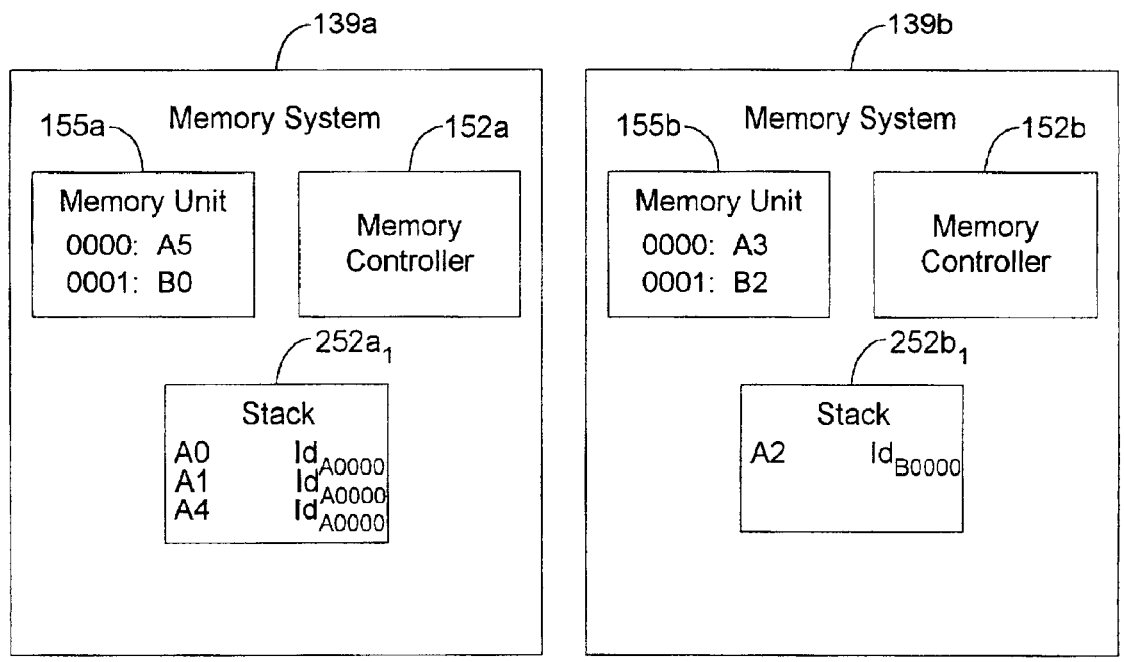
FIG. 15 is a block diagram illustrating the memory systems of FIG. 14 after a value of "A5" has been written to one of the memory systems.
Figure 15:
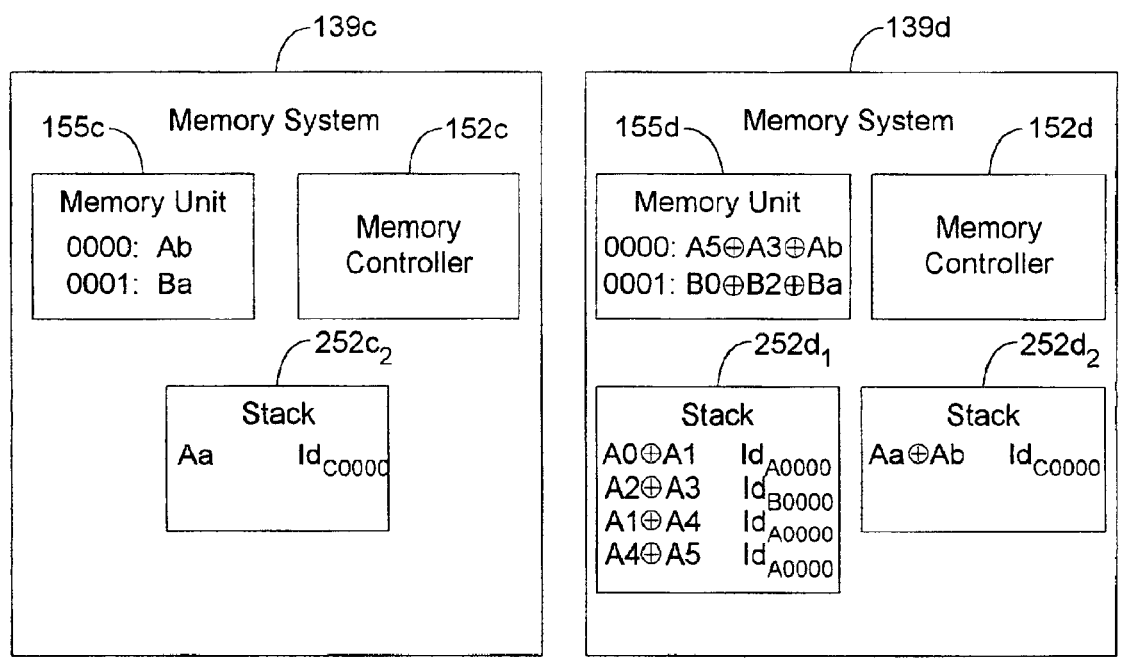

Since the result received from memory system 139a is based on values in protection domain 1, the memory controller 152d preferably stores this result and "$Id_{A0000}$" in the stack $252d_1$ associated with protection domain 1. As a result, the value "A5⊕A3⊕Ab," which is the checksum of the checksum set correlated with memory locations "0000," should be stored in memory location "0000" of memory unit 155d, and the value "A4⊕A5" along with "$Id_{A0000}$" should collectively be the top value in stack $252d_1$, as shown by FIG. 15.

In addition to transmitting the value "A4⊕A5" to memory controller 152d, the memory controller 152a also stores "A5" in memory location "0000" of memory unit 155a. Since this operation replaces "A4" with "A5," the memory controller 152a pushes "A4" along with location identifier "$Id_{A0000}$" onto the stack $252a_1$. As described above, "$Id_{A0000}$" includes or identifies the memory unit offset (i.e., "0000") associated with the memory location in which "A5" was stored. Once stacks $252a_1$, and $252d_1$ and memory locations "0000" of memory units 155a and 155d have been updated as described above, the write operation for writing "A5" is complete, and the state of memory systems 139a–139d should appear as shown by FIG. 15.

After the foregoing write request for writing "A5" is received by memory controller 152a, assume that memory controller 152a receives a request to write a data value, represented as "B1," to memory location "0001" of memory unit 155a. In response, the memory controller 152a exclusively ors "B1" with "B0" (i.e., the value presently stored in location "0001" of memory unit 155a). The memory controller 152a then transmits, in a checksum update request, the result (i.e., "B0⊕B1") of the foregoing exclusive or operation to memory controller 152d so that the appropriate checksum update can be performed according to techniques previously described.

In this regard, the memory controller 152d exclusively ors the received result (i.e., "B0⊕B1") with the checksum presently stored in location "0001" of memory unit 155d. The memory controller 152d also stores the result (i.e., "B0⊕B1") received from memory system 139a into one of the stacks of the memory system 139d along with a location identifier, represented as "$Id_{A0001}$," that identifies the memory system 139a from which the result was transmitted. "$Id_{A0001}$" also identifies the memory unit offset (i.e., "0001") associated with the memory location from which the foregoing result was derived. Note that "$Id_{A0001}$" may be included in the checksum update request.

Figure 16:
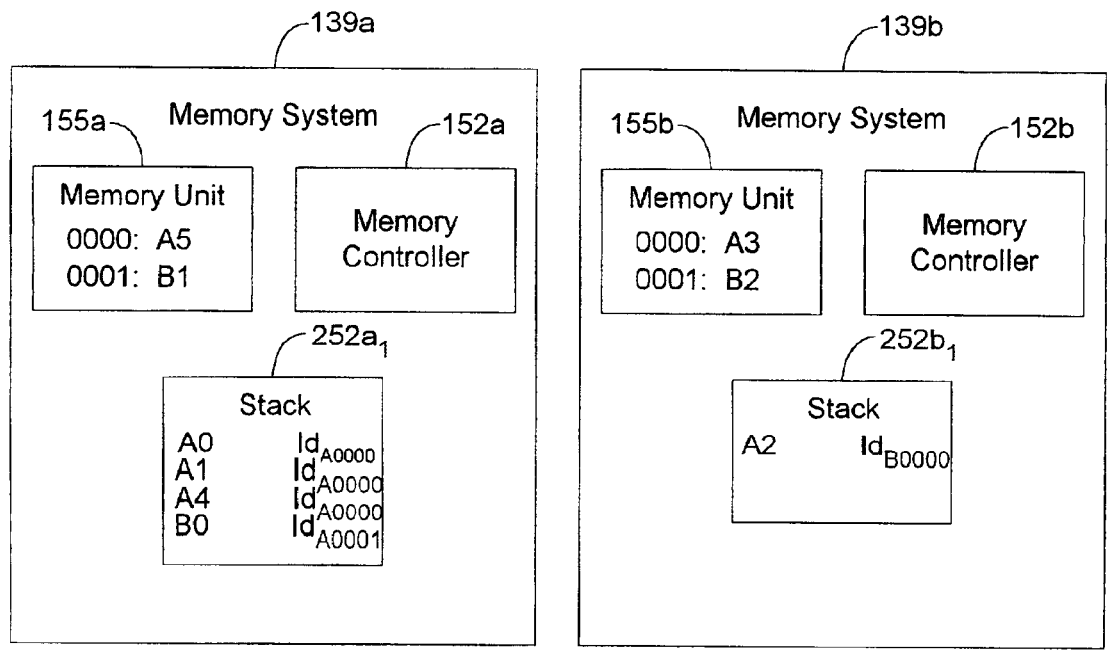
FIG. 16 is a block diagram illustrating the memory systems of FIG. 15 after a value of "B1" has been written to one of the memory systems.
Figure 16:
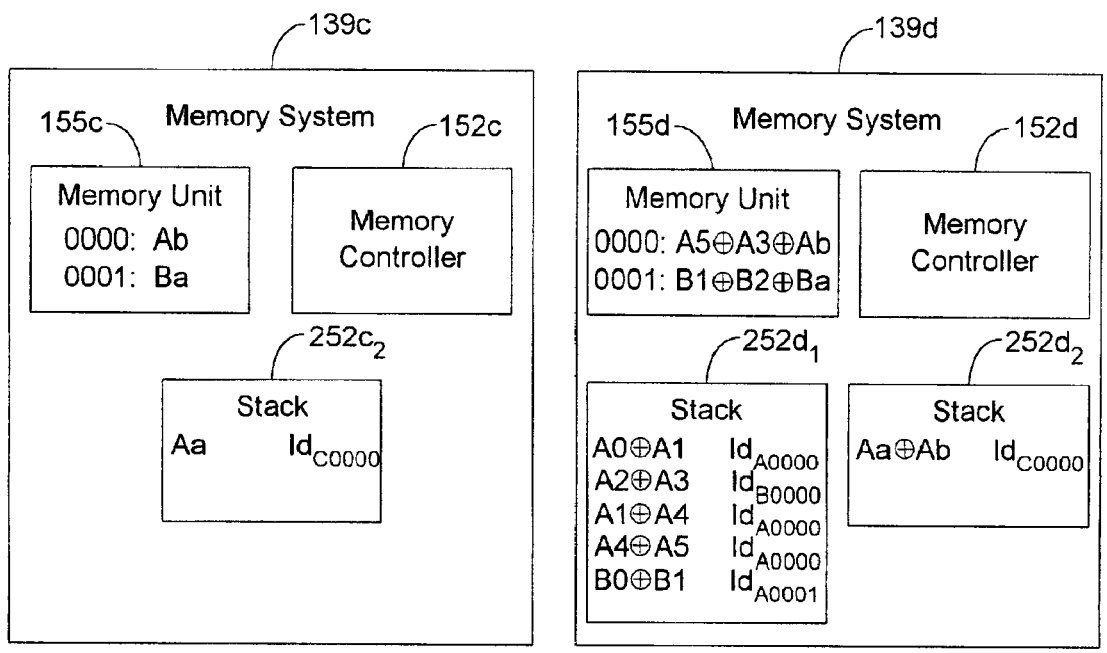

Since the result received from memory system 139a is based on values in protection domain 1, the memory controller 152d preferably stores this result and "$Id_{A0001}$" in the stack $252d_1$ associated with protection domain 1. As a result, the value "B1⊕B2⊕Ba," which is the checksum of the checksum set correlated with memory locations "0001," should be stored in memory location "0001" of memory unit 155d, and the value "B0⊕B1" along with "IdAooo1" should collectively be the top value in stack $252d_1$, as shown by FIG. 16.

In addition to transmitting the value "B0⊕B1" to memory controller 152d, the memory controller 152a also stores "B1" in memory location "0001" of memory unit 155a. Since this operation replaces "B0" with "B1," the memory controller 152a pushes "B0" along with location identifier "IdAoool" onto the stack $252a_1$. As described above, "$Id_{A0001}$" includes or identifies the memory unit offset (i.e., "0001") associated with the memory location in which "B1" was stored. Once stacks $252a_1$ and $252d_1$ and memory locations "0001" of memory units 155a and 155d have been updated as described above, the write operation for writing "B1" is complete, and the state of memory systems 139a–139d should appear as shown by FIG. 16.

After the foregoing write request for writing "B1" is received by memory controller 152a, assume that memory controller 152c receives a request to write a data value, represented as "Bb," to memory location "0001" of memory unit 155c. In response, the memory controller 152c exclusively ors "Bb" with "Ba" (i.e., the value presently stored in location "0001" of memory unit 155c). The memory controller 152c then transmits, in a checksum update request, the result (i.e., "Ba⊕Bb") of the foregoing exclusive or operation to memory controller 152d so that the appropriate checksum update can be performed according to techniques previously described.

In this regard, the memory controller 152d exclusively ors the received result (i.e., "Ba⊕Bb") with the checksum presently stored in location "0001" of memory unit 155d. The memory controller 152d also stores the result (i.e., "Ba⊕Bb") received from memory system 139c into one of the stacks of the memory system 139d along with a location identifier, represented as "$Id_{C0001}$," that identifies the memory system 139c from which the result was transmitted. "$Id_{C0001}$" also identifies the memory unit offset (i.e., "0001") associated with the memory location from which the foregoing result was derived. Note that "$Id_{C0001}$" may be included in the checksum update request.

Figure 17:
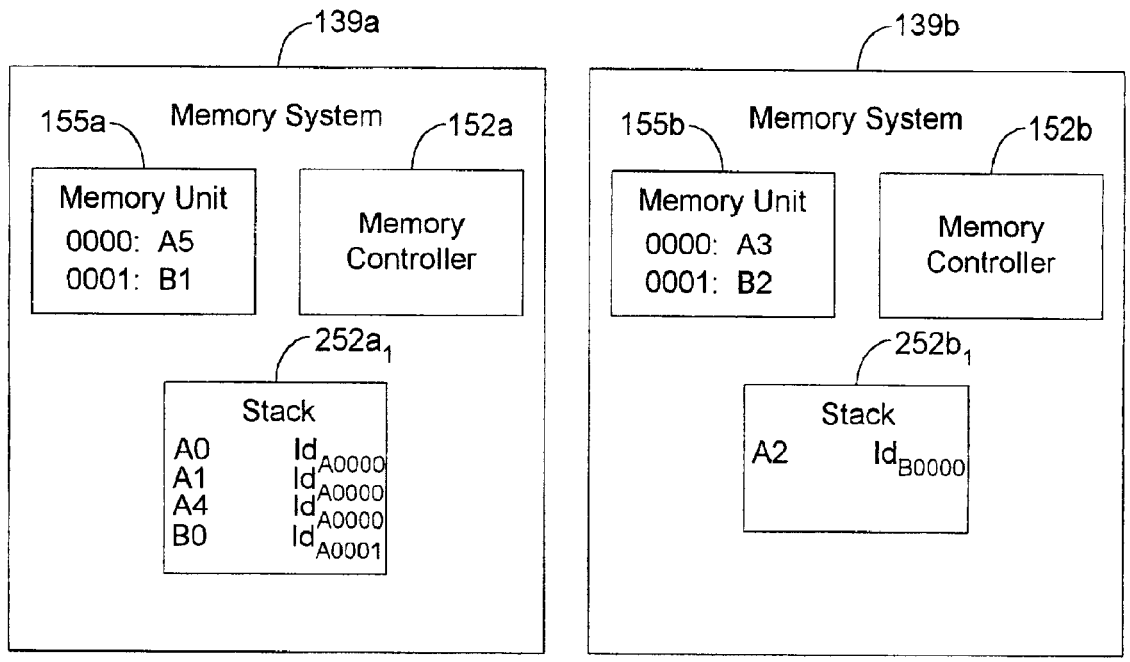
FIG. 17 is a block diagram illustrating the memory systems of FIG. 16 after a value of "Bb" has been written to one of the memory systems.
Figure 17:
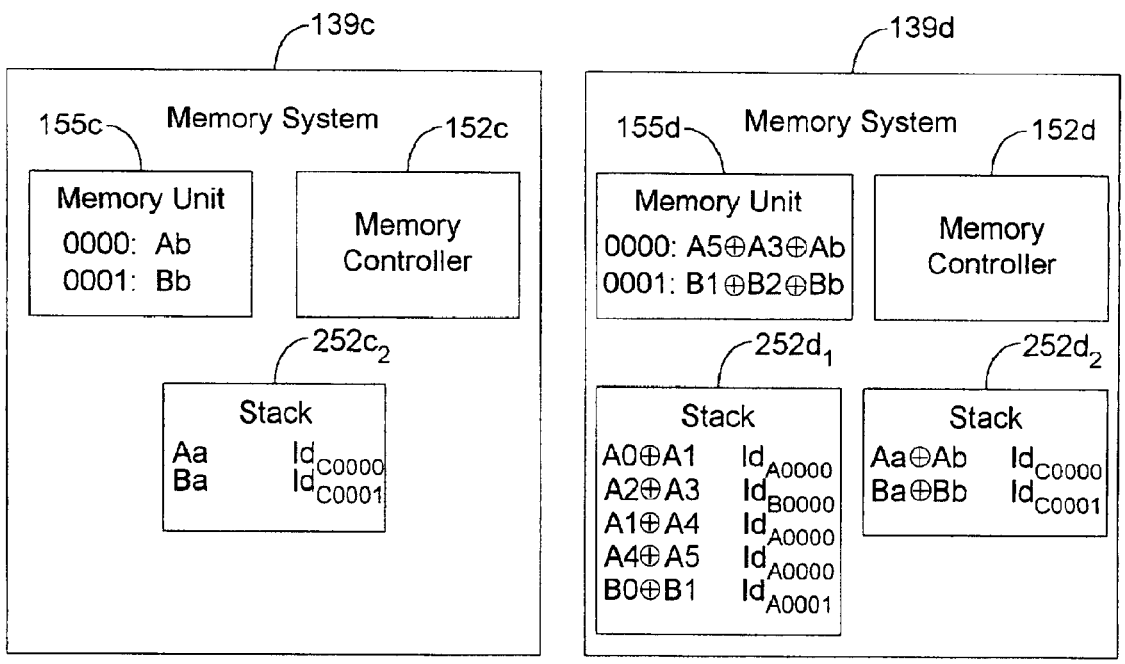

Since the result received from memory system 139c is based on values in protection domain 2, the memory controller 152d preferably stores this result and "$Id_{C0001}$" in the stack $252d_2$ associated with protection domain 2. As a result, the value "B1⊕B2⊕Bb," which is the checksum of the checksum set correlated with memory locations "0001," should be stored in memory location "0001" of memory unit 155d, and the value "Ba⊕Bb" along with "$Id_{C0001}$" should collectively be the top value in stack $252d_2$, as shown by FIG. 17.

In addition to transmitting the value "Ba⊕Bb" to memory controller 152d, the memory controller 152c also stores "Bb" in memory location "0001" of memory unit 155c. Since this operation replaces "Ba" with "Bb," the memory controller 152c pushes "Ba" along with location identifier "$Id_{C0001}$" onto the stack $252c_2$. As described above, "$Id_{C0001}$" includes or identifies the memory unit offset (i.e., "0001") associated with the memory location in which "Bb" was stored. Once stacks $252c_2$ and $252d_2$ and memory locations "0001" of memory units 155c and 155d have been updated as described above, the write operation for writing "Bb" is complete, and the state of memory systems 139a–139d should appear as shown by FIG. 17.

After the write operation for writing "Bb" is complete, assume that memory system 139a fails. Thus, no data can be written to or retrieved from memory system 139a. However, assume that the mapper 146 attempts to access memory location "0000" of the failed memory system 139a. In attempting to access this memory location, the mapper 146 should detect that the memory system 139a has failed and, therefore, instruct memory controller 152d to rebuild the lost data value (i.e., "A5") stored in memory unit 155a at location "0000." The process for rebuilding a lost data value is described in detail in commonly assigned U.S. patent application Ser. No. 09/773,124, entitled "System and Method for Building a Checksum" and filed Jan. 31, 2001, which is incorporated herein by reference.

Figure 18:
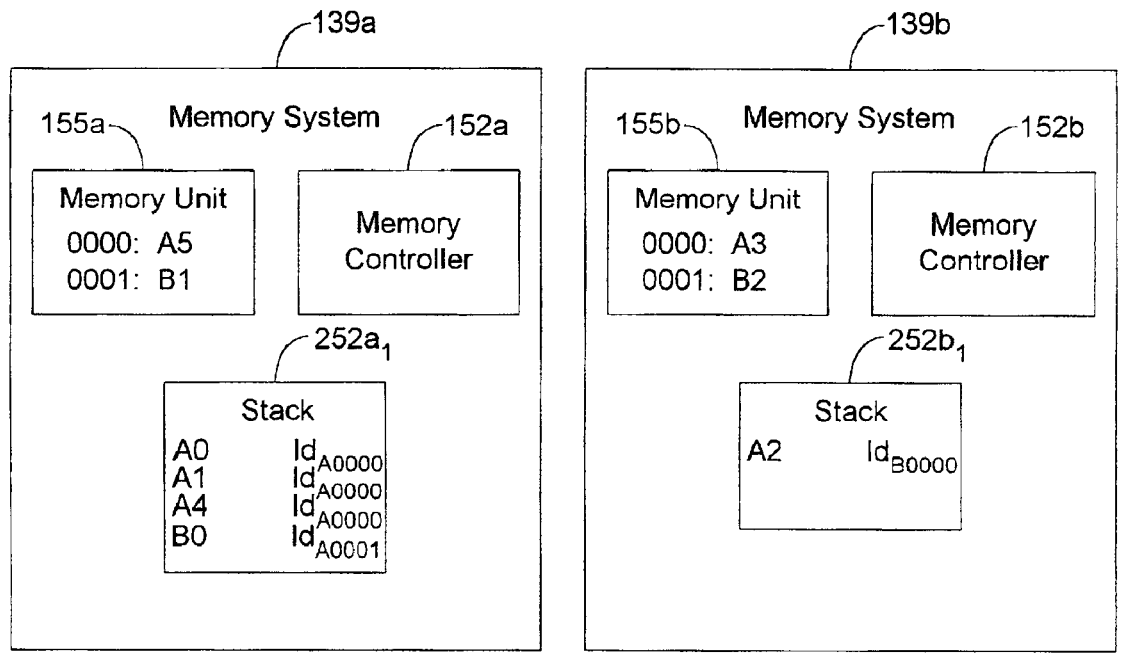
FIG. 18 is a block diagram illustrating the memory systems of FIG. 17 after a lost data value has been recovered and written to one of the memory systems.
Figure 18:
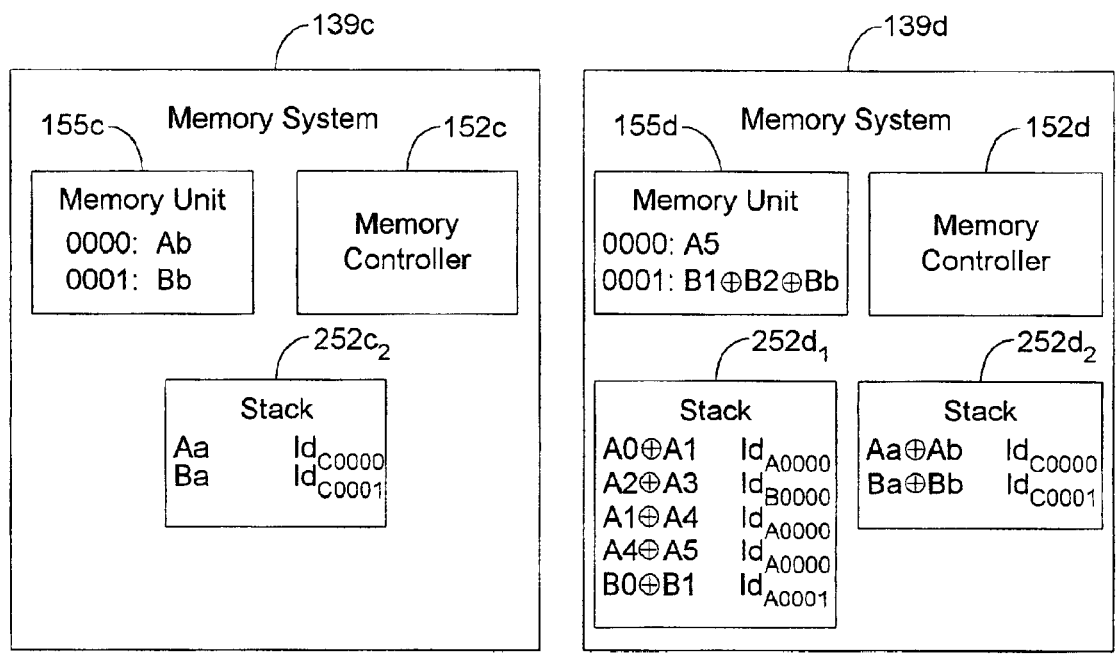

In this regard, the memory controller 152d requests retrieval of each non-checksum value of the checksum set that includes the lost data value, "A5." Thus, in the present example, the memory controller 152d requests retrieval of the data value "A3" from memory location "0000" of memory unit 155b and the data value "Ab" from memory location "0000" of memory unit 155c. The memory controller 152d then exclusively ors these retrieved values with the checksum (i.e., "A5⊕A3⊕Ab") of the checksum set. This checksum is stored at memory location "0000" of memory unit 155d. The result of the foregoing exclusive or operation should be the lost data value (i.e., "A5"), which will be referred to hereafter as the "recovered data value." In the preferred embodiment, the memory controller 152d overwrites the checksum of the checksum set with the recovered data value. Thus, in the present example, the memory controller 152d stores the recovered data value in memory location "0000" of memory unit 155d, as shown by FIG. 18.

Once the recovered data value is stored in memory unit 155d, the process of rebuilding the lost data value is complete. Note that once the rebuilding process is complete, the mapper 146 should update its mappings such that any future write or read request that would have accessed memory location "0000" of the failed memory unit 155a now accesses memory location "0000" of memory unit 155d. Furthermore, since the recovered data value is associated with protection domain 1, the memory location "0000" in memory unit 155d of the recovered data value should now be assigned to protection domain 1.

Figure 19:
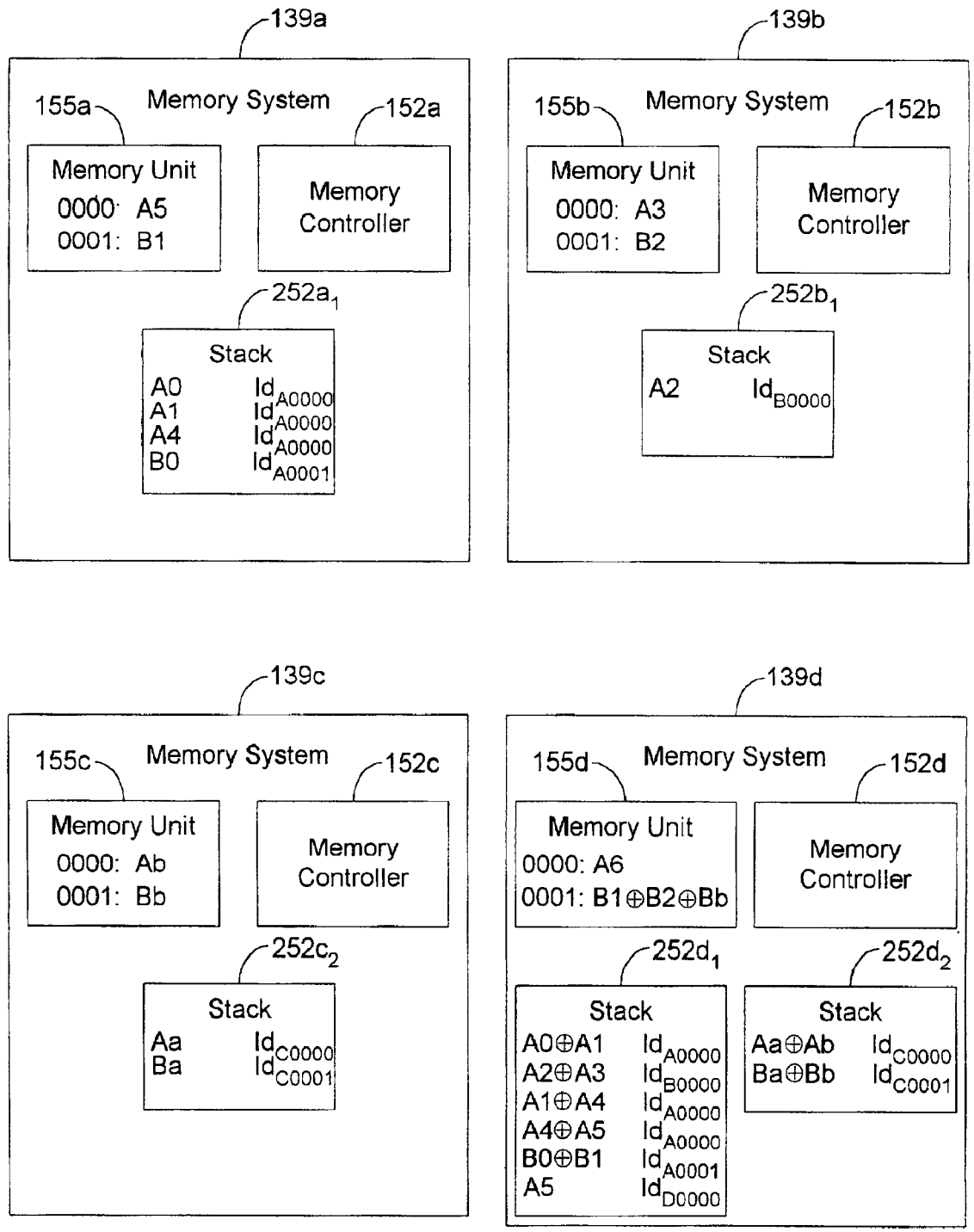
FIG. 19 is a block diagram illustrating the memory systems of FIG. 18 after a value of "A6" has been written to one of the memory systems.

After the recovered data value is stored in memory unit 155d, assume that memory controller 152d receives a request to write a data value, represented as "A6," to memory location "0000" of memory unit 155d. In response, the memory controller 152d stores "A6" in memory location "0000" of memory unit 155d. Since this operation replaces "A5" with "A6," the memory controller 152d pushes "A5" along with location identifier "$Id_{D0000}$" onto the stack within memory system 139d that is associated with the protection domain of the memory location in which "A6" was stored. Since the foregoing memory location is now associated with protection domain 1, the memory controller 152d stores "A5" along with "$Id_{D0000}$" to stack $252d_1$. Note that "$Id_{D0000}$" identifies memory system 139d and includes or identifies the memory unit offset (i.e., "0000") associated with the foregoing memory location. Once stack $252d_1$ and memory location "0000" of memory unit 155d have been updated as described above, the write operation for writing "A6" is complete, and the state of memory systems 139a–139d should appear as shown by FIG. 19.

Note that, in the preferred embodiment, a recovered data value is used to overwrite its checksum. Therefore, the checksum of a checksum set is no longer maintained once a value of the checksum set has been recovered. Thus, in writing "A6" to memory unit 155d, there is no need for memory controller 152d to transmit a checksum update request.

After the foregoing write request for writing "A6" is received by memory controller 152d, assume that memory controller 152c receives a request to write a data value, represented as "Bc," to memory location "0001" of memory unit 155c. In response, the memory controller 152c exclusively ors "Bc" with "Bb" (i.e., the value presently stored in location "0001" of memory unit 155c). The memory controller 152c then transmits, in a checksum update request, the result (i.e., "Bb⊕Bc") of the foregoing exclusive or operation to memory controller 152d so that the appropriate checksum update can be performed according to techniques previously described.

In this regard, the memory controller 152d exclusively ors the received result (i.e., "Bb⊕Bc") with the checksum presently stored in location "0001" of memory unit 155d. The memory controller 152d also stores the result (i.e., "Bb⊕Bc") received from memory system 139c into one of the stacks of the memory system 139d along with an identifier, represented as "$Id_{C0001}$," that identifies the memory system 139c from which the result was transmitted. "$Id_{C0001}$" also identifies the memory unit offset (i.e., "0001") associated with the memory location from which the foregoing result was derived. Note that "$Id_{C000}$," may be included in the checksum update request.

Figure 20:
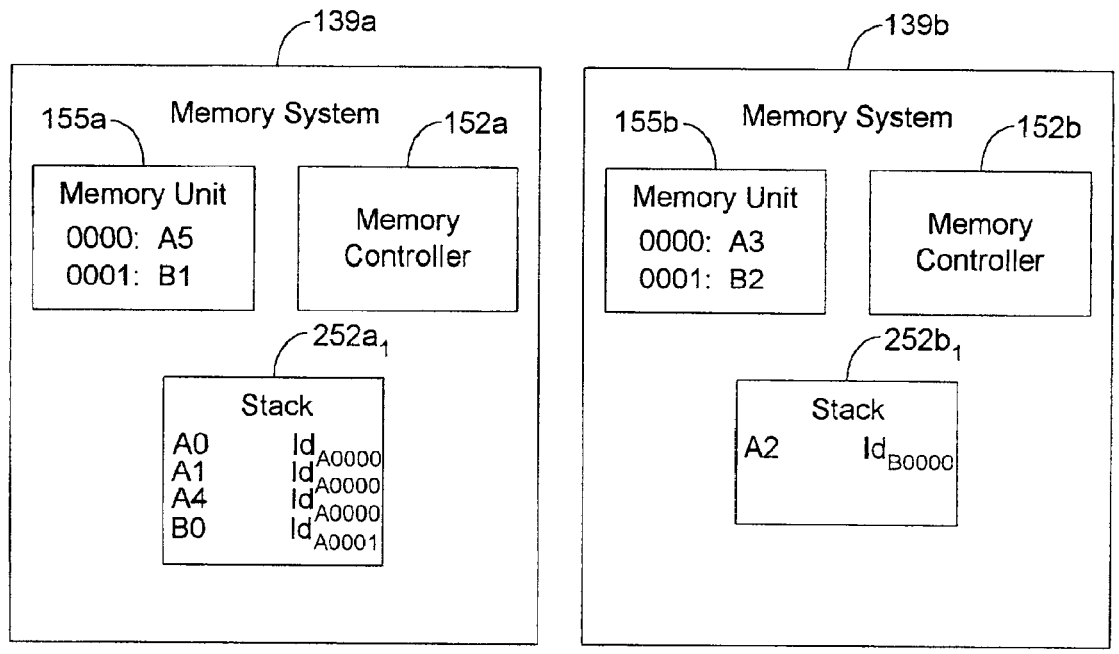
FIG. 20 is a block diagram illustrating the memory systems of FIG. 19 after a value of "Bc" has been written to one of the memory systems.
Figure 20:
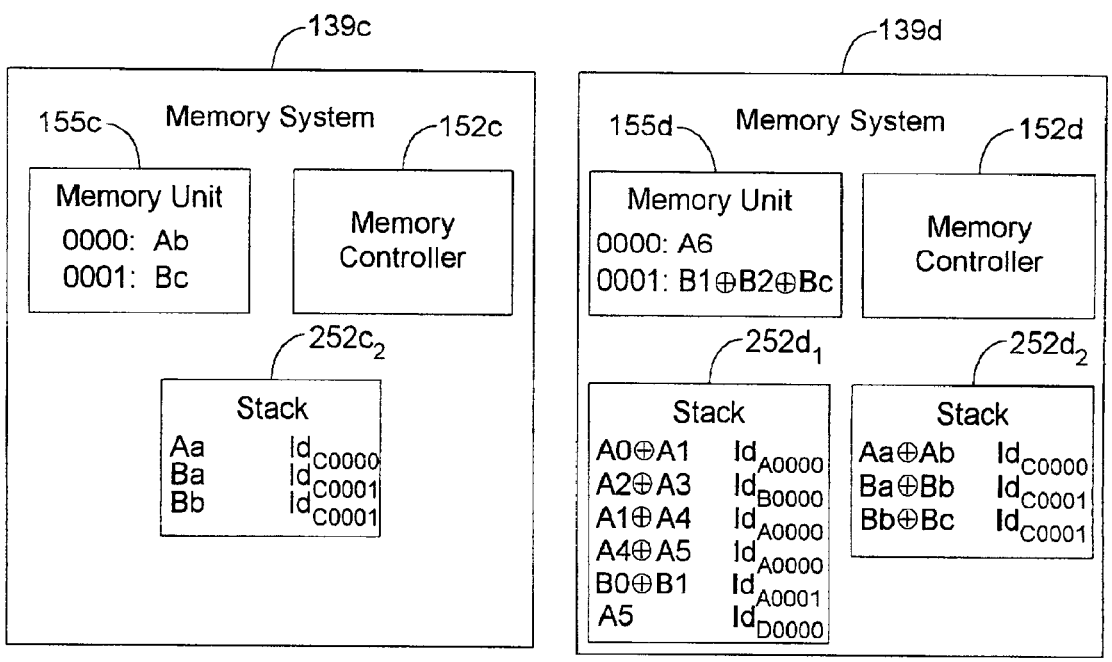

Since the result received from memory system 139c is based on values in protection domain 2, the memory controller 152d preferably stores this result and "$Id_{C0001}$" in the stack $252d_2$ associated with protection domain 2. As a result, the value "B1⊕B2⊕Bc," which is the checksum of the checksum set correlated with memory locations "0001," should be stored in memory location "0001" of memory unit 155d, and the value "Bb⊕Bc" along with "$Id_{C0001}$" should collectively be the top value in stack $252d_2$, as shown by FIG. 20.

In addition to transmitting the value "Bb⊕Bc" to memory controller 152d, the memory controller 152c also stores "Bc" in memory location "0001" of memory unit 155c. Since this operation replaces "Bb" with "Bc," the memory controller 152c pushes "Bb" along with location identifier "$Id_{C0001}$" onto the stack $252c_2$. As described above, "$Id_{C0001}$" includes or identifies the memory unit offset (i.e., "0001") associated with the memory location in which "Bc" was stored. Once stacks $252c_2$ and $252d_2$ and memory locations "0001" of memory units 155c and 155d have been updated as described above, the write operation for writing "Bc" is complete, and the state of memory systems 139a–139d should appear as shown by FIG. 20.

Next, assume that a failure or an error in protection domain 1 occurs and that it is, therefore, desirable to perform a BER for protection domain 1 To achieve this, each stack associated with protection domain 1 is analyzed. In this regard, each stack data value and its associated location identifier is successively pulled from the stack on a LIFO basis. If the location identifier of one of the pulled data values identifies the failed memory system 139a, then the one pulled data value is exclusively ored with the value presently stored in the stack's memory system at the memory location identified by the associated location identifier. The result of this exclusive or operation is then stored in this identified memory location.

However, if the location identifier of the one value identifies the stack's memory system, then the one pulled data value is used to overwrite the value presently stored in the stack's memory system at the memory location identified by the location identifier. Furthermore, if the location identifier of the one pulled data value identifies a memory system other than the failed memory system 139a and the stack's memory system, then the one pulled data value is simply discarded.

Figure 21:
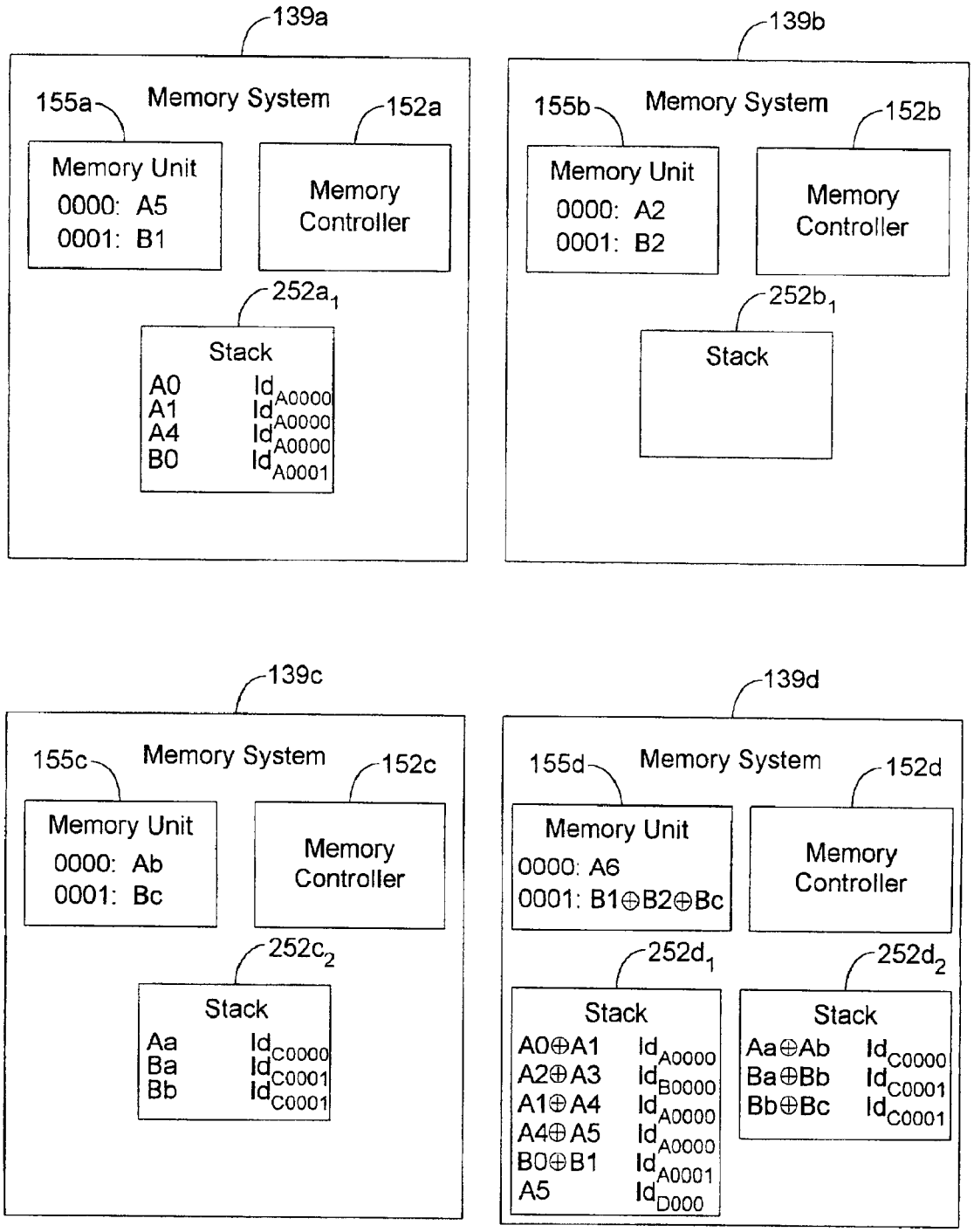
FIG. 21 is a block diagram illustrating the memory systems of FIG. 20 after one of the memory systems has performed BER.

Thus, in the present example, the memory controller 152b pulls the top value (i.e., "A2" along with "$Id_{B0000}$") of the stack $252b_1$. Since "$Id_{B0000}$" identifies the same memory system that includes the stack $252b_1$ (i.e., since "$Id_{B0000}$" identifies memory system 139b), the memory controller 152b overwrites the value within memory unit 155b at the location having the same memory unit offset included in "$Id_{B0000}$." In other words, the memory controller 152b overwrites "A3" with "A2," as shown by FIG. 21. Since there are no more values in the stack $252b_1$, the memory controller 152b takes no further action to complete the BER process.

The memory system 139c of FIG. 21 has no values within a stack associated with protection domain 1. Therefore, memory controller 152c takes no action to complete the BER process.

Figure 22:
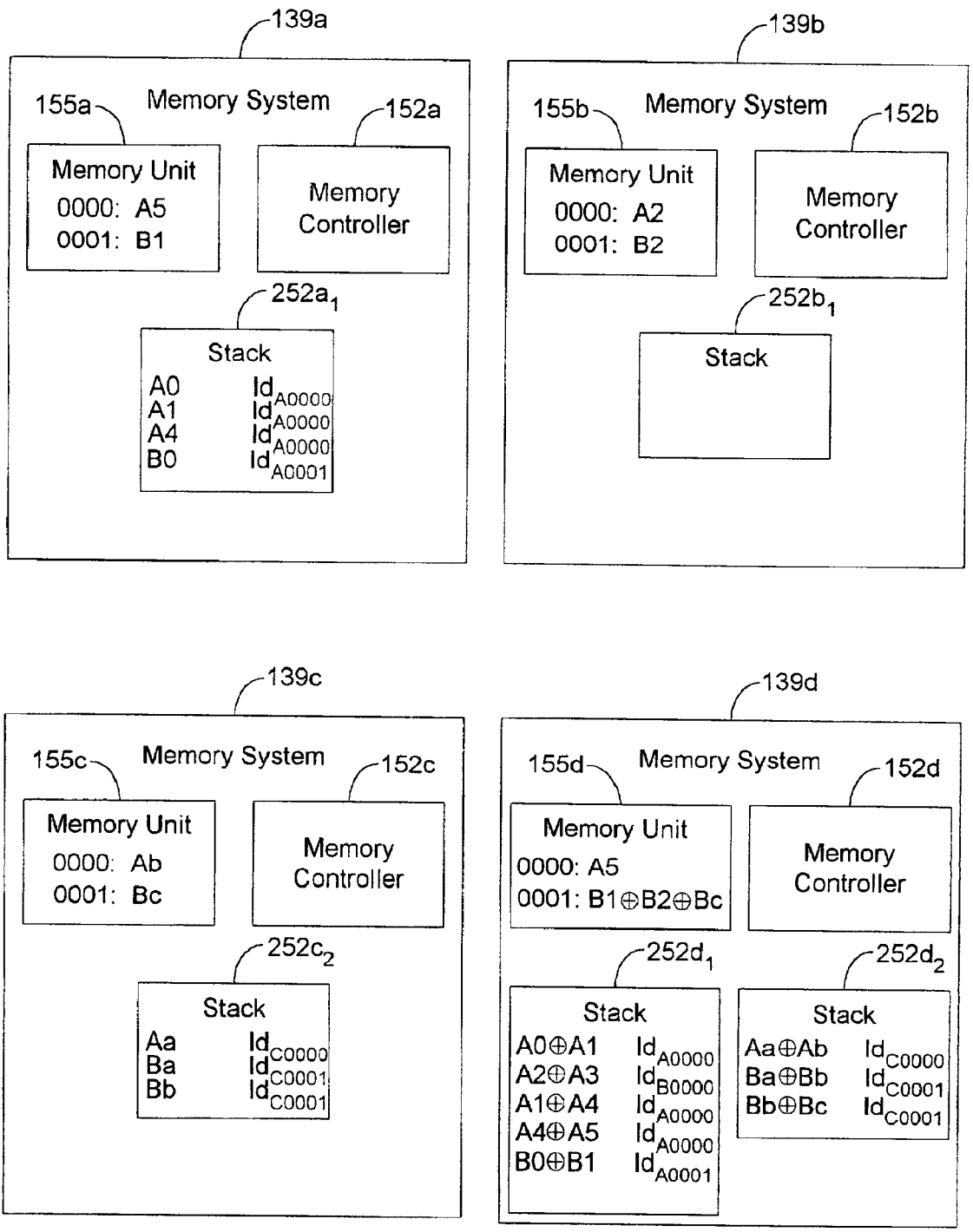
FIG. 22 is a block diagram illustrating the memory systems of FIG. 21 after a first top value has been pulled from a stack and processed by one of the memory systems in performing BER.

To complete the BER process, memory controller 152d first pulls the top value (i.e., "A5" along with "$Id_{D0000}$") from its stack $252d_1$ associated with protection domain 1. Since "$Id_{D0000}$" identifies the same memory system that includes the stack $252d_1$ (i.e., since "$Id_{D0000}$" identifies memory system 139d), the memory controller 152d overwrites the value (i.e., "A6") within memory unit 155d at the location having the same memory unit offset included in "$Id_{D0000}$." In other words, the memory controller 152d overwrites or replaces "A6" with "A5," as shown by FIG. 22.

Figure 23:
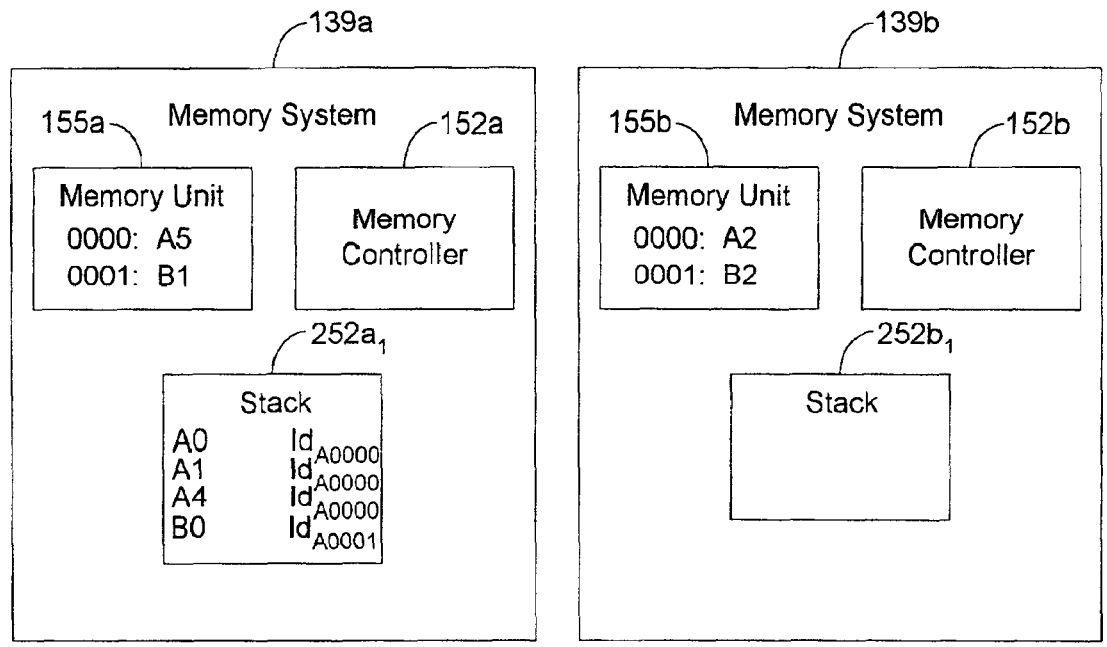
FIG. 23 is a block diagram illustrating the memory systems of FIG. 22 after a second top value has been pulled from the stack and processed by the one memory system in performing th e BER.
Figure 23:
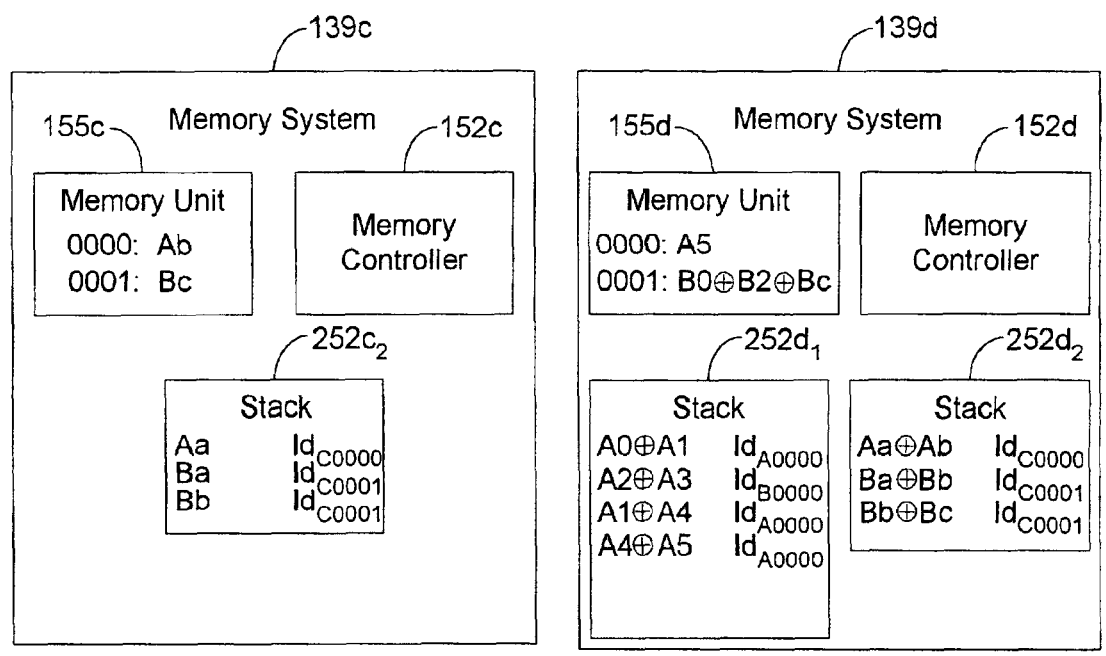

The memory controller 152d then pulls the next top value (i.e., "B0⊕B1" along with "$Id_{A0001}$") from the stack $252d_1$ associated with protection domain 1. Since "$Id_{A0001}$," identifies the failed memory system 139a, the memory controller 152d exclusively ors "B0⊕B1" with the value (i.e., "B1⊕B2⊕Bc") presently stored in memory unit 155d at the location having the same memory unit offset included in "$Id_{A0001}$." This operation produces "B0⊕B2⊕Bc," which is stored in the foregoing location, as shown by FIG. 23.

Figure 24:
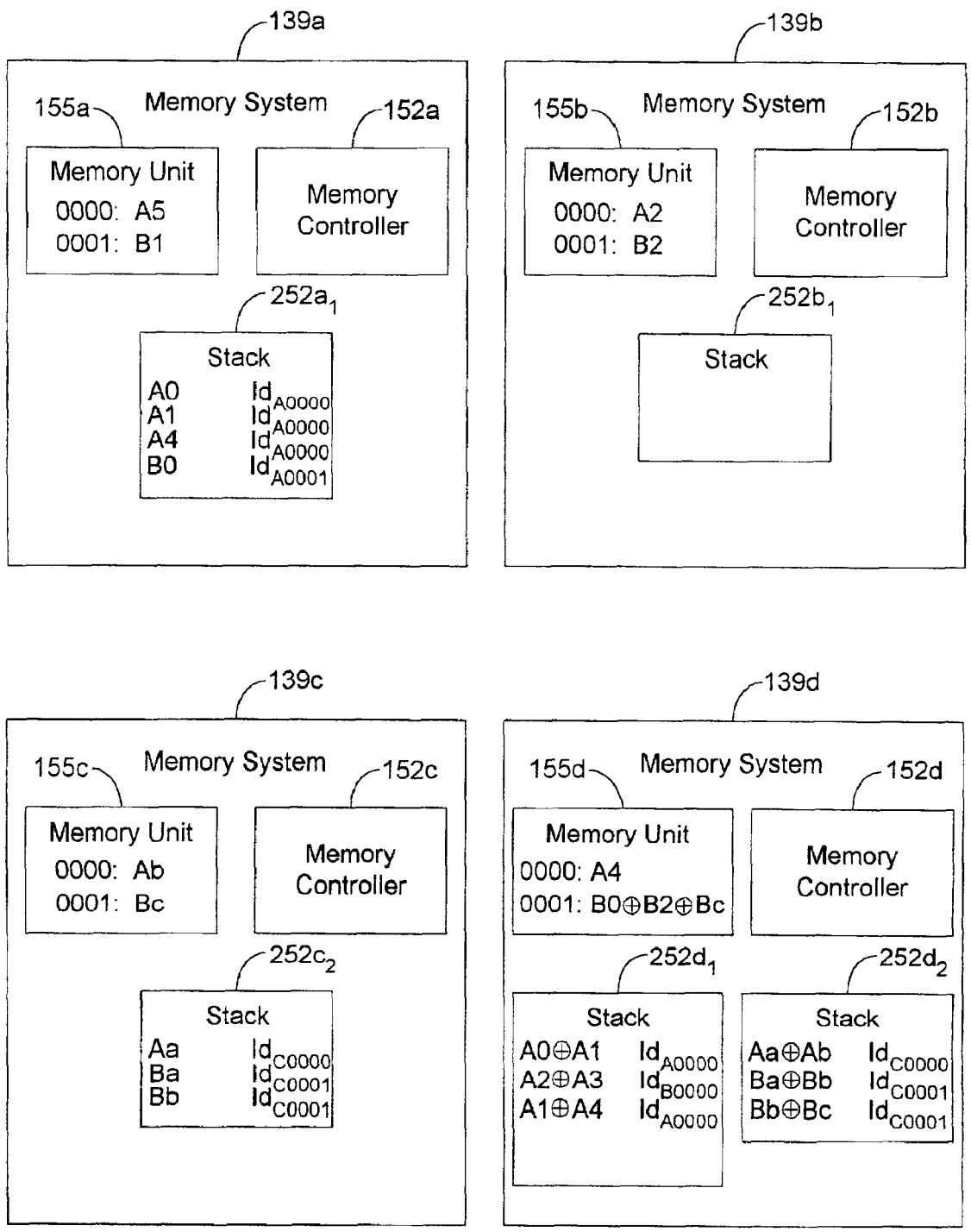
FIG. 24 is a block diagram illustrating the memory systems of FIG. 23 after a third top value has been pulled from the stack and processed by the one memory system in performing the BER.

Next, the memory controller 152d pulls the next top value (i.e., "A4⊕A5" along with "$Id_{A0000}$") from the stack $252d_1$ associated with protection domain 1. Since "$Id_{A0000}$" identifies the failed memory system 139a, the memory controller 152d exclusively ors "A4⊕A5" with the value (i.e., "A5") presently stored in memory unit 155d at the location having the same memory unit offset included in "$Id_{A0000}$." This operation produces "A4," which is stored in the foregoing location, as shown by FIG. 24.

Figure 25:
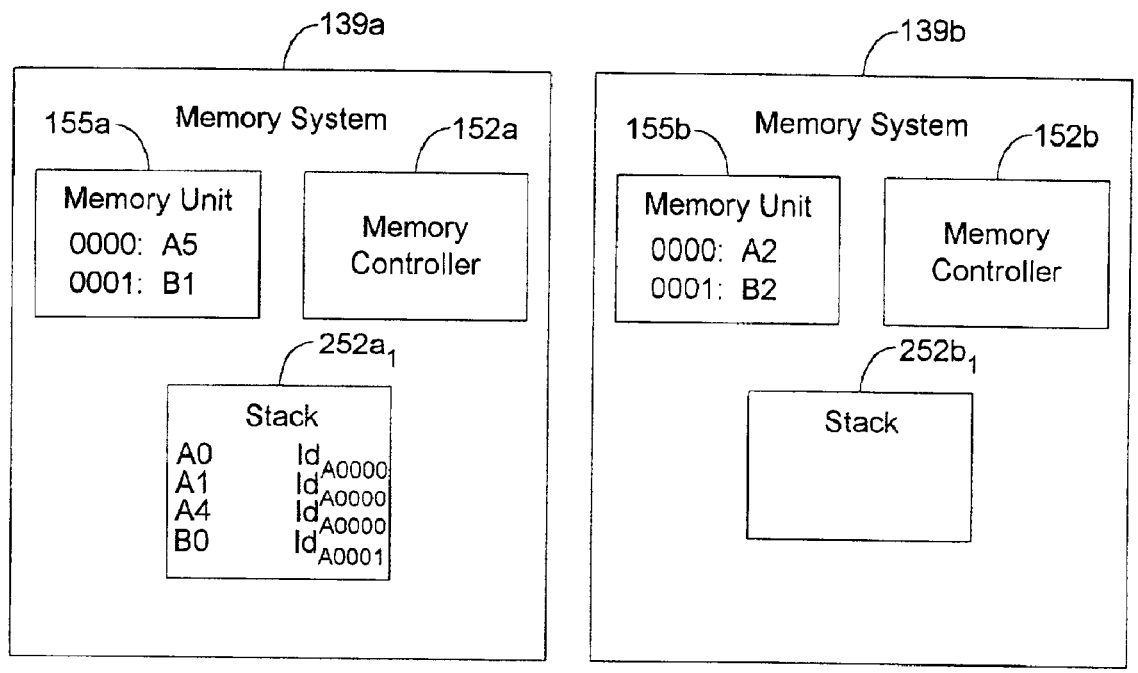
FIG. 25 is a block diagram illustrating the memory systems of FIG. 24 after a fourth top value has been pulled from the stack and processed by the one memory system in performing the BER.
Figure 25:
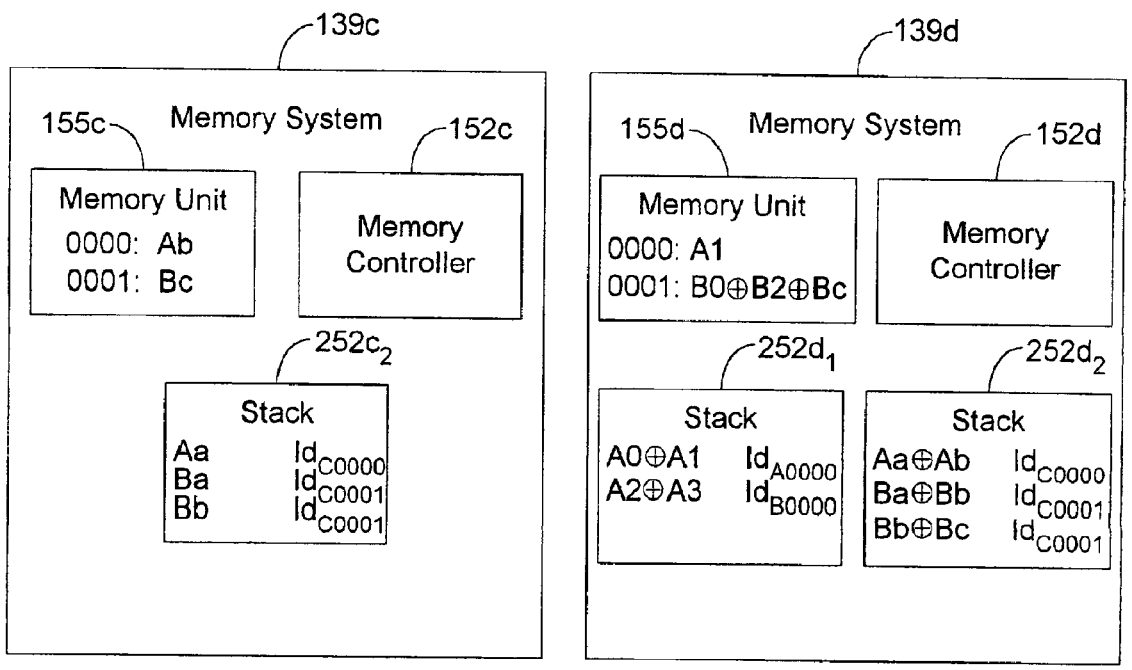

The memory controller 152d then pulls the next top value (i.e., "A1⊕A4" along with "$Id_{A0000}$") from the stack $252d_1$ associated with protection domain 1. Since "$Id_{A0000}$" identifies the failed memory system 139a, the memory controller 152d exclusively ors "A1⊕A4" with the value (i.e., "A4") presently stored in memory unit 155d at the location having the same memory unit offset included in "$Id_{A0000}$." This operation produces "A1," which is stored in the foregoing location, as shown by FIG. 25.

Figure 26:
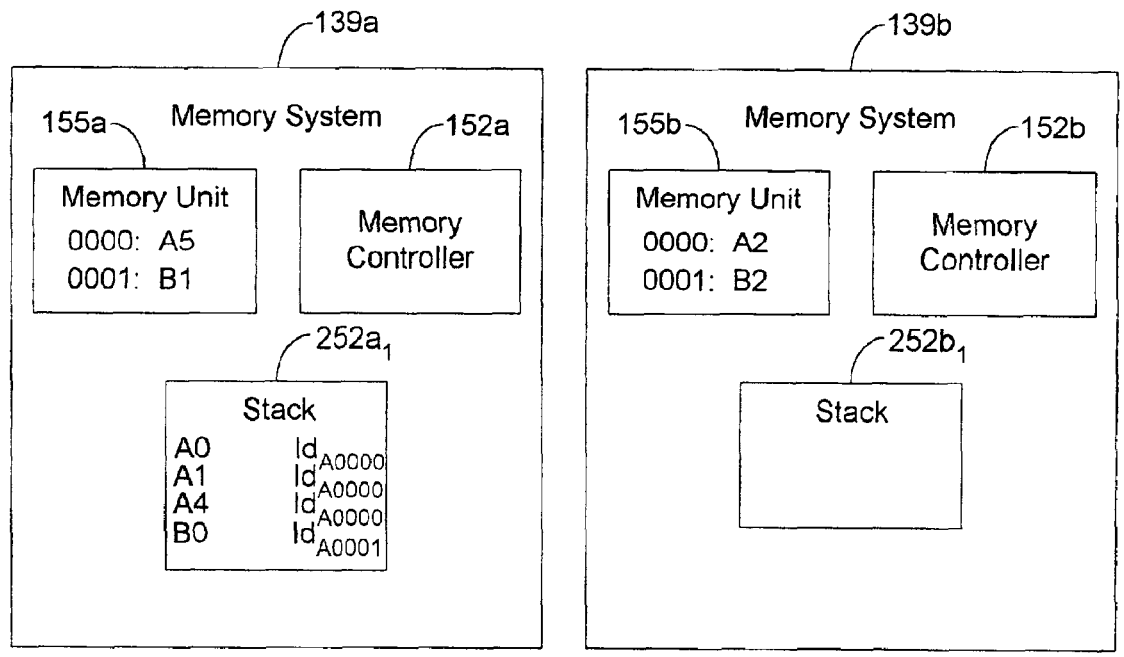
FIG. 26 is a block diagram illustrating the memory systems of FIG. 25 once the one memory system has completed the BER.
Figure 26:
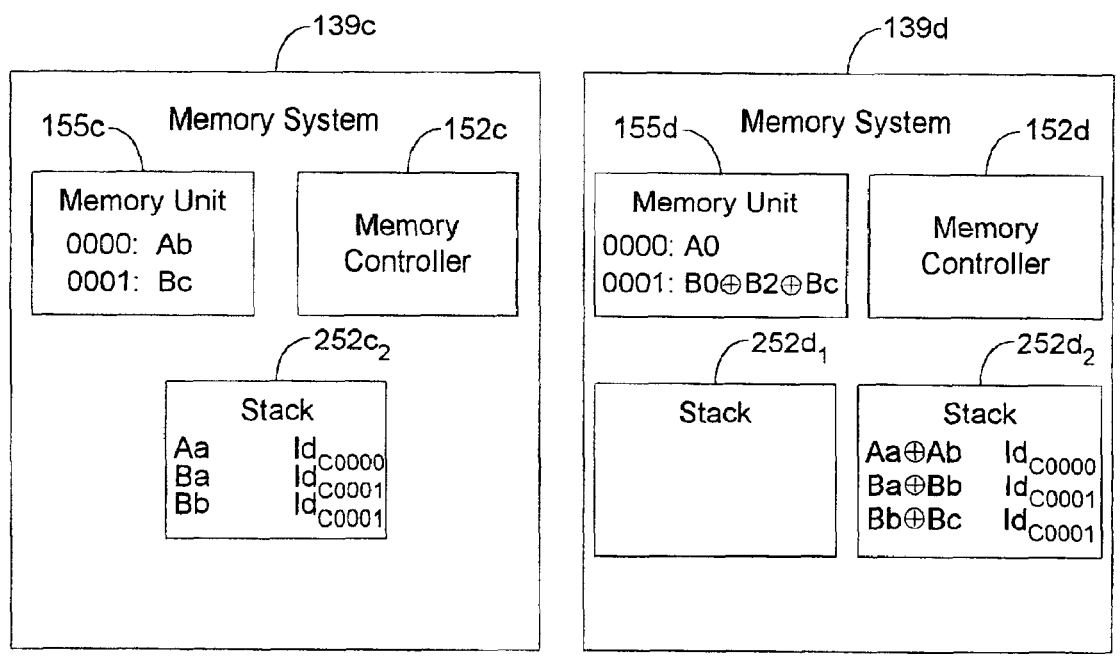

Next, the memory controller 152d pulls the next top value (i.e., "A2⊕A3" along with "$Id_{B0000}$") from the stack $252d_1$ associated with protection domain 1. Since "$Id_{B0000}$" identifies a memory system other than systems 139a and 139d, the memory controller 152d simply discards "A2⊕A3" Then, the memory controller 152d pulls the next top value (i.e., "A0⊕A1" along with "$Id_{A0000}$") from the stack $252d_1$ of memory system 139d associated with protection domain 1. Since "$Id_{A0000}$" identifies the failed memory system 139a, the memory controller 152d exclusively ors "$A_0 \oplus A1$" with the value (i.e., "A1") presently stored in memory unit 155d at the location having the same memory unit offset included in "Id$_{A0000}$." This operation produces "A0," which is stored in the foregoing location, as shown by FIG. 26.

At this point, the BER process is complete. As can be seen by referring to FIG. 26, the BER process has been performed for protection domain 1 without affecting the values associated with protection domain 2. Note that similar techniques may be employed to perform a BER process for protection domain 2.

Note that, after the lost data value in location "0000" of the failed memory system 139a has been recovered, any checksum update in response to a write request for writing to the same location "0000" of memory system 139b or 139c is preferably prevented. Thus, assume that, after completion of the BER process, memory controller 152c receives a request to write a data value, represented as "Bd," to memory location "0001" of memory unit 155c. In response, the memory controller 152c exclusively ors "Bd" with "Bc" (i.e., the value presently stored in location "0001" of memory unit 155c). The memory controller 152c then transmits, in a checksum update request, the result (i.e., "Bc⊕Bd") of the foregoing exclusive or operation to memory controller 152d so that the appropriate checksum update can be performed according to techniques previously described.

In this regard, the memory controller 152d exclusively ors the received result (i.e., "Bc⊕Bd") with the checksum presently stored in location "0001" of memory unit 155d. The memory controller 152d also stores the result (i.e., "Bc⊕Bd") received from memory system 139c into one of the stacks of the memory system 139d along with a location identifier, represented as "IdC0001," that identifies the memory system 139c from which the result was transmitted. "Id$_{C0000}$" also identifies the memory unit offset (i.e., "0001") associated with the memory location from which the foregoing result was derived. Note that "Id$_{C0001}$" may be included in the checksum update request.

Figure 27:
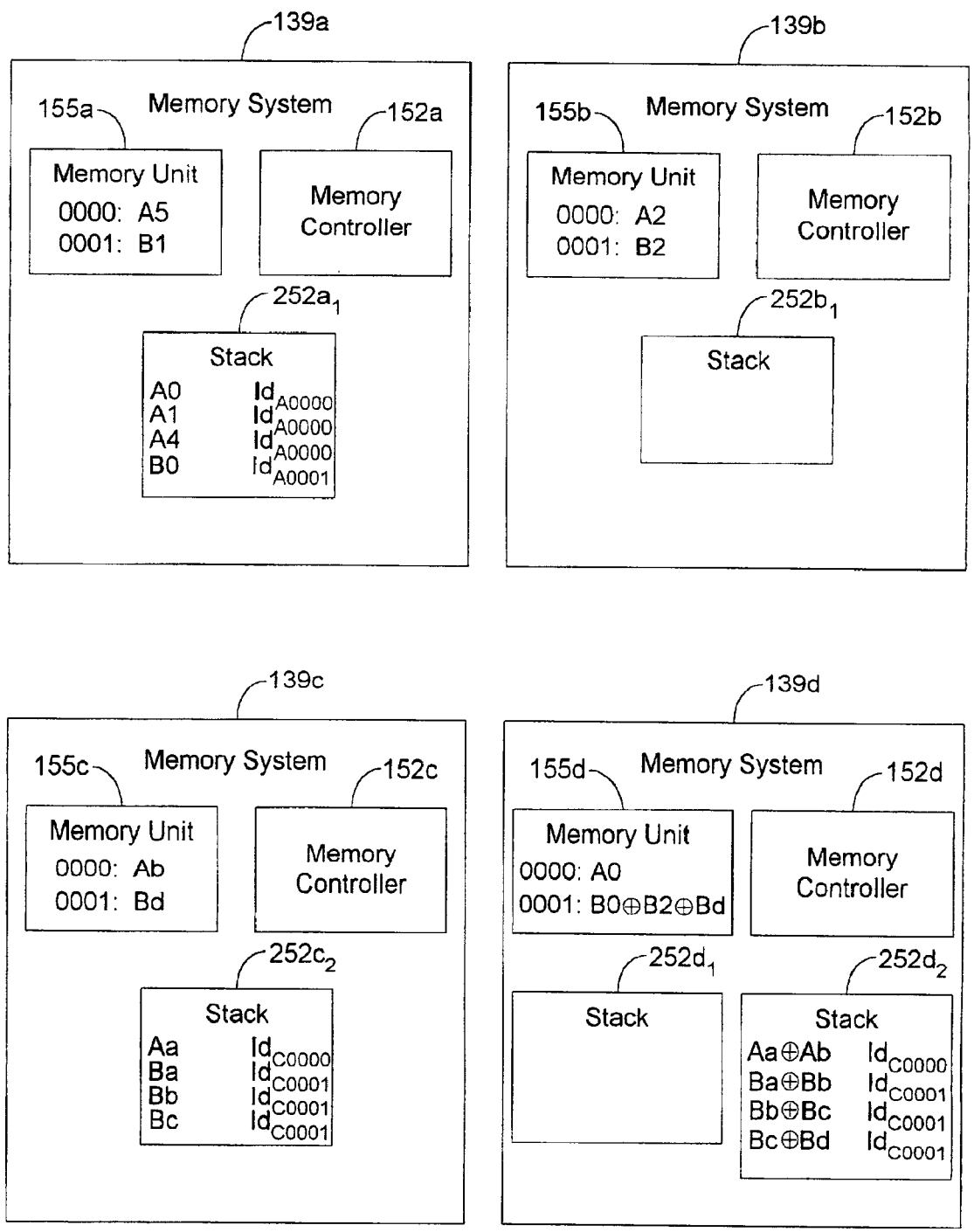
FIG. 27 is a block diagram illustrating the memory systems of FIG. 26 after a value of "Bd" has been written to one of the memory systems.

Since the result received from memory system 139c is based on values in protection domain 2, the memory controller 152d preferably stores this result and "Id$_{C0001}$" in the stack 252d$_2$ associated with protection domain 2. As a result, the value "B1⊕B2⊕Bd," which is the checksum of the checksum set correlated with memory locations "0001," should be stored in memory location "0001" of memory unit 155d, and the value "Bc⊕Bd" along with "Id$_{C0001}$" should collectively be the top value in stack 252d$_2$, as shown by FIG. 27.

In addition to transmitting the value "Bc⊕Bd" to memory controller 152d, the memory controller 152c also stores "Bd" in memory location "0001" of memory unit 155c. Since this operation replaces "Bc" with "Bd," the memory controller 152c pushes "Bc" along with "Id$_{C0001}$" onto the stack 252c$_2$. "Id$_{C0001}$," includes or identifies the memory unit offset (i.e., "0001") associated with the memory location in which "Bd" was stored. Once stacks 252c$_2$ and 252d$_2$ and memory locations "0001" of memory units 155c and 155d have been updated as described above, the write operation for writing "Bd" is complete, and the state of memory systems 139a–139d should appear as shown by FIG. 27.

Figure 28:
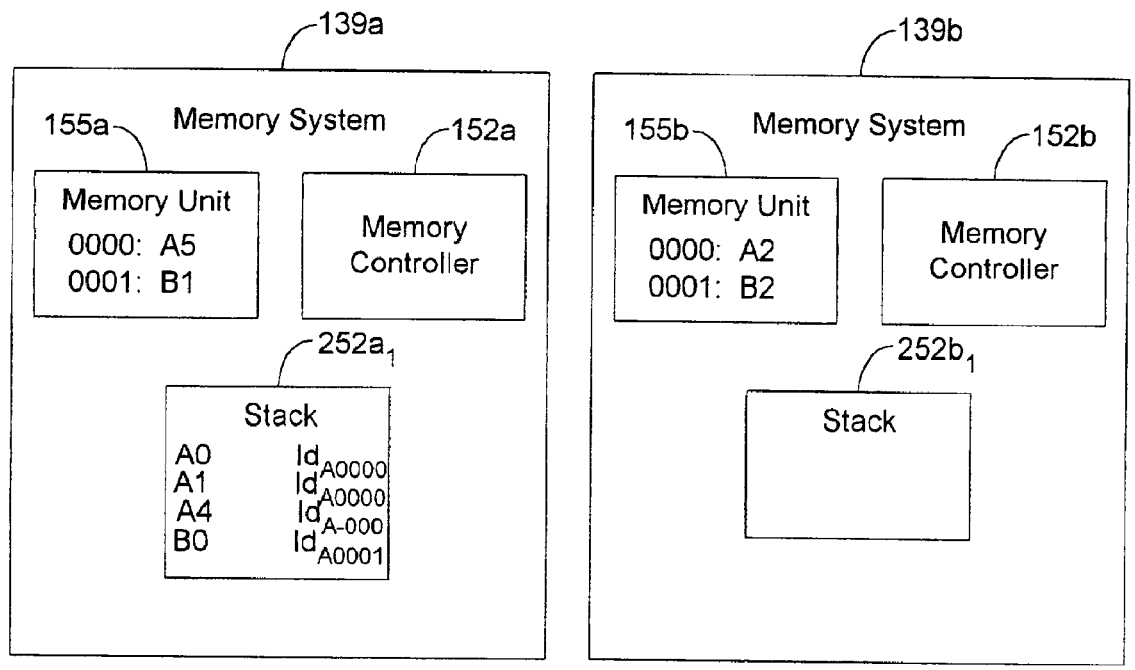
FIG. 28 is a block diagram illustrating the memory systems of FIG. 27 after a value of "Ac" has been written to one of the memory systems.
Figure 28:
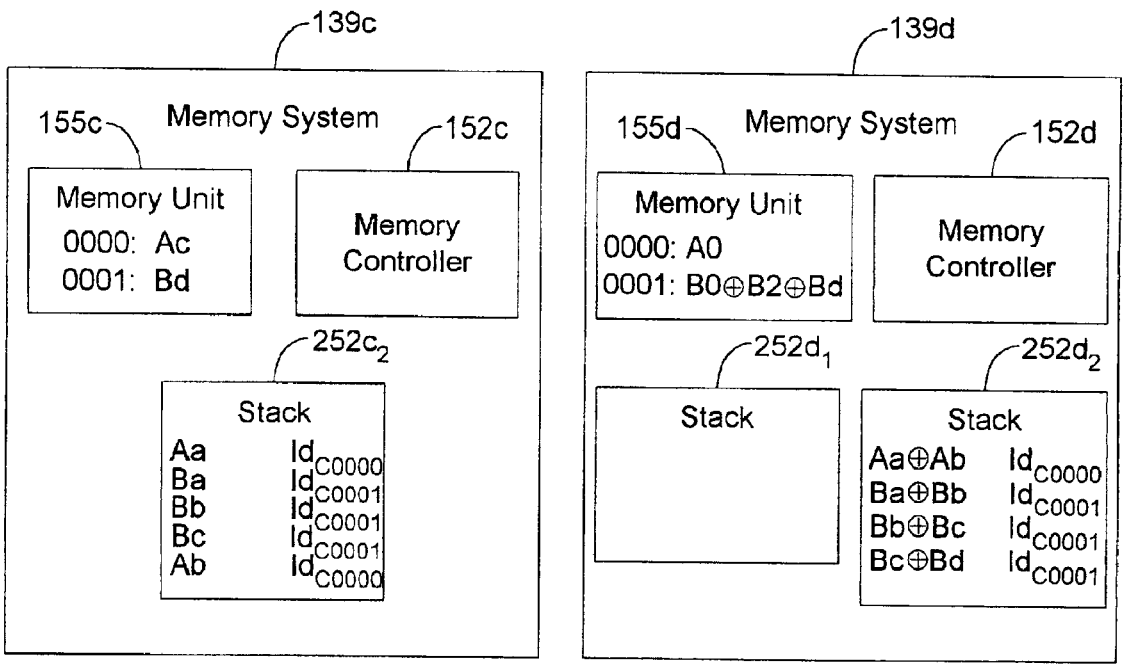

After the memory controller 152d receives the request for writing "Bd," assume that memory controller 152c receives a request to write a data value, represented as "Ac," to memory location "0000" of memory unit 155c. Since such a request writes to memory location "0000" of a memory system (i.e., system 139c), any checksum update based on the foregoing write request is preferably prevented, as shown by FIG. 28.

Note that by having multiple stacks in each memory system, BER can be performed for one protection domain without affecting other protection domains, as described above. However, it is possible to utilize similar techniques to perform BER for multiple protection domains. Indeed, it is possible to utilize only one stack in each memory system 139a–139d and to perform a BER process for each protection domain. However, such an embodiment, may needlessly perform BER processes for protection domains that do not benefit from a BER process.

In describing the BER process for memory system 139d, FIGS. 22–25 depict multiple values stored in memory location "0000" of memory unit 155d. However, it should be noted that it is not necessary to store each of these values into location "0000" of memory unit 155d. For example, the values "A5," "B0⊕B1," "A4⊕A5," "A1⊕A4," and "A0⊕A1" pulled from the stack 252d$_1$ may be exclusively ored together, and the result of these exclusive or operations may then be exclusively ored with the value "A6" being stored in the "0000" location before the BER process.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A computer system capable of performing backward error recovery, comprising:

a memory unit having a plurality of memory locations; and a memory controller configured to maintain a checksum in one of said memory locations, said memory controller further configured to receive a plurality of requests to update said checksum with a plurality of combined data values, said memory controller configured to combine said checksum to each of said combined data values and to store each of said combined data values, at least one of said combined data values representing a result of combining a first data value with a second data value, wherein said first data value and said second data value are stored at different times in the same memory location of a memory unit, said memory controller further configured to retrieve a plurality of said combined data values, including said one combined data value, in response to a data error and to recover a previous state of a particular memory location by combining each of said retrieved data values to said checksum.

2. The system of claim 1, wherein said memory controller is configured to combine each of said retrieved data values to said checksum by exclusively oring each of said retrieved data values to said checksum.

3. The system of claim 1, wherein each of said stored data values represents an exclusive or result between a first data value and a second data value that is replaced in memory by said first data value.

4. The system of claim 1, further comprising a first stack and a second stack, wherein said memory controller is configured to determine which protection domains are associated with said combined data values, and wherein said memory controller, in storing said combined data values, is configured to store in said first stack each of said combined data values determined by said memory controller to be associated with a first protection domain and to store in said second stack each of said combined data values determined by said memory controller to be associated with a second protection domain.

5. The system of claim 4, wherein said memory controller is configured to identify one of said protection domains in response to said data error and to select one of said stacks based on which of said protection domains is identified by said memory controller, and wherein each of said retrieved data values is retrieved from said selected stack.

6. The system of claim 5, wherein said memory controller is configured to correlate each of said stored data values with a memory controller identifier identifying another memory controller that transmitted the correlated data value.

7. The system of claim 6, wherein each of said retrieved data values is correlated with a memory controller identifier identifying a failed memory controller.

8. The system of claim 1, wherein said memory controller is configured to identify a particular memory location in response to said data error and to identify which of said data values to retrieve in response to said data error based on which of said data values are associated with said particular memory location.

9. The system of claim 8, wherein each of said retrieved data values represents an exclusive or result between a first data value and a second data value that is replaced in said particular memory location by said first data value.

10. The system of claim 1, wherein said one combined data value is formed by exclusively oring said first and second data values.

11. The system of claim 1, wherein said first data value is used to overwrite said second data value at said memory location.

12. The system of claim 1, wherein said memory controller is further configured to correlate said one combined value with a memory location identifier that identifies said memory location.

13. The system of claim 12, wherein said memory controller is configured to perform backward error recovery for a specified protection domain, to determine whether said one combined value is associated with said specified protection domain based on said memory location identifier, and to combine said one combined value with said checksum during said backward error recovery for said specified protection domain if said one combined value is associated with said specified protection domain.

14. The system of claim 12, wherein said memory controller is further configured to combine said one combined value with said checksum based on said memory location identifier.

15. The system of claim 12, wherein said memory controller is further configured to store said one combined value and said memory location identifier to a stack.

16. The system of claim 15, wherein said stack is associated with a single protection domain.

17. The system of claim 15, wherein said memory controller is configured to perform backward error recovery in response to said data error and to pull said one combined value and said memory location identifier from said stark to perform said backward error recovery in response to said data error.

18. A computer system capable of performing backward error recovery, comprising:
a plurality of memory units, each of said memory units having a plurality of memory locations; and
a plurality of memory controllers configured to store to and retrieve from said memory units, one of said memory controllers configured to maintain, in a checksum memory location, a checksum of a checksum set, the other of said memory controllers configured to receive a plurality of write requests for writing to said checksum set, said other memory controllers, for each of said write requests, configured to store a first data value in one of said memory locations, to retrieve a second data value from said one memory location, to combine said first data value with said second data value thereby forming a combined value, and to transmit said combined value to said one memory controller,
wherein said one memory controller is configured to update said checksum memory location with a plurality of combined values formed by said other memory controllers and to store each of said plurality of combined values, said one memory controller further configured to retrieve said stored plurality of combined values in response to a data error and to combine said retrieved combined values with said checksum.

19. The system of claim 18, wherein said memory locations within said memory units are assigned to different protection domains, and wherein said one memory controller is configured to determine, in a plurality of determinations, which of said protection domains is associated with each of said combined values, said memory controller further configured to store said plurality of combined values associated with different protection domains in different stacks based on said determinations.

20. The system of claim 18, wherein said one memory controller is configured to correlate each said plurality of combined values with an identifier that identifies the memory controller that transmitted the correlated combined value to said one memory controller.

21. The system of claim 20, wherein each of said values retrieved by said one memory controller is correlated with the same identifier, said same identifier identifying a failed memory controller.

22. The system of claim 18, wherein said memory locations within said memory units are assigned to different protection domains, and wherein said one memory controller is further configured to identify which of said protection domains is associated with said data error and to retrieve said plurality of retrieved combined values based on said identified protection domain.

23. The system of claim 22, wherein each of said retrieved combined values is associated with said identified protection domain.

24. The system of claim 18, wherein said first data value is combined with said second data value via an exclusive or operation to form said combined value.

25. A method for performing backward error recovery, comprising the steps of:
storing a plurality of data values within a checksum set to a plurality of memory locations, said checksum set including a checksum value and a plurality of non-checksum values;
updating one of said memory locations with a first value;
combining said first value to a second value to form a combined value, said second value stored in said one memory location prior to said updating step;
updating said checksum value with said combined value;
storing said combined value;
retrieving said combined value in response to a data error;
combining said value retrieved in said retrieving step to said checksum value; and recovering a previous state of said one memory location based on said combining said retrieved value step.

26. The method of claim 25, wherein said combining said first value step includes the step of exclusively oring said first value with said second value, and wherein said combining said retrieved value step includes the step of exclusively oring said checksum value to said retrieved value.

27. The method of claim 25, further comprising the step of associating said data error with a particular protection domain, wherein said retrieving step is based on said associating step.

28. The method of claim 25, further comprising the step of assigning to a respective protection domain each of said memory locations that is storing one of said non-checksum values, wherein said storing said combined values step is based on which protection domain is assigned to said one memory location.

29. The method of claim 28, further comprising the step of selecting a stack based on which protection domain is assigned to said one memory location, wherein said storing said combined value step includes the step of storing said combined value to said selected stack based on said selecting step.

30. A method for performing backward error recovery, comprising the steps of:
   storing a plurality of data values within a checksum set to a plurality of memory locations, said checksum set including a checksum value and a plurality of non-checksum values;
   assigning said memory locations to different protection domains;
   storing new non-checksum values to said memory locations;
   for each of said new non-checksum values stored to one of said memory locations, combining said new non-checksum value with a value previously stored in said one memory location thereby forming a combined value;
   updating said checksum value with each combined value formed via said combining step;
   storing into memory each combined value formed via said combining step;
   detecting a data error;
   identifying a protection domain associated with said data error;
   selecting a plurality of combined values formed in said combining step based on said identifying step;
   combining each of said selected combined values with said checksum value in response to said data error; and
   recovering a previous state of one of said memory locations based on said combining each of said selected combined values step.

31. The method of claim 30, wherein said combining steps are exclusive oring steps.

32. The method of claim 30, further comprising the step of correlating each said value stored in said storing step with a respective one of said protection domains, wherein each value selected in said selecting step is correlated, via said correlating step, with said identified protection domain.

33. The method of claim 30, further comprising the step of respectively correlating each said value stored in said storing step with one of said protection domains, wherein said storing step is based on said correlating step.

34. The method of claim 33, wherein said storing step comprises the step of storing into the same stack each value correlated, via said correlating step, with the same protection domain.

35. A method for performing backward error recovery, comprising the steps of:
   maintaining a checksum;
   storing a first data value in a memory location;
   storing a second data value in said memory location in response to a write request;
   combining said first data value and said second data value to form a combined data value in response to said write request;
   combining said combined data value to said checksum in response to said write request;
   storing said combined data value; and
   recovering a previous state of a particular memory location in response to a data error, said recovering step comprising the steps of retrieving said combined data value and combining said combined data value to said checksum in response to said data error.

36. The method of claim 35, wherein said combining said combined data value to said checksum in response to said data error step comprises the step of exclusively oring said combined data value and said checksum.

37. The method of claim 35, further comprising the steps of:
   assigning said memory location to a protection domain; and
   correlating said data error with said protection domain,
   wherein said recovering step comprises the step of selecting, based on said assigning and correlating steps, said combined data value to be combined with said checksum.

38. A method for performing backward error recovery, comprising the steps of:
   maintaining a checksum;
   updating said checksum with a plurality of data values in response to write requests;
   correlating said data values with a plurality of protection domains;
   detecting a data error associated with one of said protection domains;
   determining which of said data values are correlated with said one protection domain in response to said data error; and
   updating, in response to said data error, said checksum with each of said data values determined by said determining step to be correlated with said one protection domain.

39. The method of claim 38, further comprising the steps of:
   storing, to a stack, said data values determined to be correlated with said one protection domain; and
   retrieving, from said stack in response to said data error, each of said data values determined to be correlated with said one protection domain.

40. The method of claim 38, wherein at least one of said data values determined to be correlated with said one protection domain represents a result of combining a first data value with a second data value, wherein said method further comprises the step of storing said first and second data values at the same memory location at different times, and wherein said updating step is based on said storing steps.

* * * * *

UNITED STATES PATENT AND TRADEMARK OFFICE
CERTIFICATE OF CORRECTION

PATENT NO. : 6,948,112 B2  Page 1 of 1
APPLICATION NO. : 09/853955
DATED : September 20, 2005
INVENTOR(S) : Bryan Hornung et al.

It is certified that error appears in the above-identified patent and that said Letters Patent is hereby corrected as shown below:

In column 9, line 35, delete "arty" and insert -- any --, therefor.

In column 16, line 11, delete "0001" and insert -- 0000 --, therefor.

In column 17, line 62, delete "A2-A3" and insert -- $A2 \oplus A3$ --, therefor.

In column 23, line 21, delete "$Id_{C000}$" and insert -- $Id_{C0001}$ --, therefor.

In column 24, line 57, delete "252d," and insert -- $252d_1$ --, therefor.

In column 25, line 33, delete "$Id_{C0000}$" and insert -- $Id_{C0001}$ --, therefor.

In column 27, line 61, in Claim 17, delete "stark" and insert -- stack --, therefor.

Signed and Sealed this

Eleventh Day of August, 2009

David J. Kappos
*Director of the United States Patent and Trademark Office*